United States Patent
Lee et al.

(10) Patent No.: US 11,863,476 B2
(45) Date of Patent: Jan. 2, 2024

(54) METHOD FOR TRANSMITTING AND RECEIVING CHANNEL STATE INFORMATION BETWEEN TERMINAL AND BASE STATION IN WIRELESS COMMUNICATION SYSTEM AND APPARATUS SUPPORTING SAME

(71) Applicant: LG Electronics Inc., Seoul (KR)

(72) Inventors: Kilbom Lee, Seoul (KR); Jiwon Kang, Seoul (KR); Jonghyun Park, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 476 days.

(21) Appl. No.: 17/041,272

(22) PCT Filed: Apr. 30, 2019

(86) PCT No.: PCT/KR2019/005185
§ 371 (c)(1),
(2) Date: Sep. 24, 2020

(87) PCT Pub. No.: WO2019/212224
PCT Pub. Date: Nov. 7, 2019

(65) Prior Publication Data
US 2021/0111846 A1    Apr. 15, 2021

(30) Foreign Application Priority Data

Apr. 30, 2018 (KR) .......... 10-2018-0049667
Mar. 19, 2019 (KR) .......... 10-2019-0030901

(51) Int. Cl.
*H04L 5/00* (2006.01)
*H04W 72/04* (2023.01)
*H04W 24/10* (2009.01)

(52) U.S. Cl.
CPC .......... *H04L 5/0048* (2013.01); *H04L 5/0035* (2013.01); *H04L 5/0053* (2013.01);
(Continued)

(58) Field of Classification Search
CPC ... H04L 5/0048; H04L 5/0035; H04L 5/0053; H04L 5/0057; H04W 24/10; H04W 72/04
See application file for complete search history.

(56) References Cited

U.S. PATENT DOCUMENTS 10,686,574 B2 * 6/2020 Ho .................. H04B 7/0695
11,121,744 B2 * 9/2021 Park ................ H04L 5/001
(Continued)

FOREIGN PATENT DOCUMENTS

KR    20130050273    5/2013

OTHER PUBLICATIONS

CATT, "Remaining Issues on NR Mobility Management," R1-1803734, 3GPP TSG RAN WG1 Meeting #92bis, Sanya, China, Apr. 16-20, 2018, 3 pages.
(Continued)

*Primary Examiner* — Redentor Pasia
(74) *Attorney, Agent, or Firm* — Fish & Richardson P.C.

(57) ABSTRACT

Disclosed are a method for transmitting and receiving channel state information between a terminal and a base station in a wireless communication system and an apparatus supporting same. According to an embodiment applicable to the present invention, a terminal may receive, from a base station, configuration information related to a first channel state information reference signal (CSI-RS) resource for measurement, measure channel state information using a CSI-RS transmitted from a neighbor cell on the basis of the configuration information, and transmit the measured channel state information to the base station.

18 Claims, 17 Drawing Sheets

(52) U.S. Cl.
CPC ........... *H04L 5/0057* (2013.01); *H04W 24/10* (2013.01); *H04W 72/04* (2013.01)

(56) References Cited

U.S. PATENT DOCUMENTS

| | | | | |
|---|---|---|---|---|
| 11,362,784 | B2* | 6/2022 | Kwak | H04W 72/044 |
| 2015/0078271 | A1* | 3/2015 | Kim | H04L 5/005 |
| | | | | 370/329 |
| 2015/0092768 | A1* | 4/2015 | Ng | H04J 11/0069 |
| | | | | 370/350 |
| 2015/0146644 | A1* | 5/2015 | Kim | H04L 5/0023 |
| | | | | 370/329 |
| 2015/0201369 | A1* | 7/2015 | Ng | H04W 48/12 |
| | | | | 370/254 |
| 2015/0304997 | A1* | 10/2015 | Park | H04J 11/00 |
| | | | | 370/330 |
| 2015/0341882 | A1* | 11/2015 | Davydov | H04W 76/11 |
| | | | | 370/336 |
| 2017/0310377 | A1* | 10/2017 | Kang | H04L 25/0224 |
| 2018/0115357 | A1* | 4/2018 | Park | H04L 5/0051 |
| 2018/0249339 | A1* | 8/2018 | Noh | H04L 27/261 |
| 2018/0323850 | A1* | 11/2018 | Baligh | H04W 48/12 |
| 2019/0028913 | A1* | 1/2019 | Park | H04L 25/02 |
| 2019/0097693 | A1* | 3/2019 | Park | H04L 5/0023 |
| 2019/0223161 | A1* | 7/2019 | Muruganathan | H04L 5/0035 |
| 2019/0230549 | A1* | 7/2019 | Wang | H04B 7/0617 |
| 2019/0335475 | A1* | 10/2019 | Liang | H04W 72/541 |
| 2020/0366350 | A1* | 11/2020 | Hao | H04B 7/0417 |
| 2021/0203392 | A1* | 7/2021 | Kwak | H04B 7/0632 |
| 2021/0391964 | A1* | 12/2021 | Kwak | H04L 27/26 |

OTHER PUBLICATIONS

Intel Corporation, "Remaining details of RRM measurements," R1-1802388, 3GPP TSG RAN WG1 Meeting #92, Athens, Greece, Feb. 26-Mar. 2, 2018, 7 pages.

Intel Corporation, "Summary of Offline Discussion for NR RRM measurements," R1-1805696, 3GPP TSG RAN WG1 Meeting #92bis, Sanya, China, Apr. 16-20, 2018, 13 pages.

PCT International Search Report in International Application No. PCT/KR2019/005185, dated Aug. 22, 2019, 20 pages.

ZTE, Sanechips, "Summary of offline discussion on CSI measurement," R1-1805606, 3GPP TSG RAN WG1 Meeting #92bis, Sanya, China, Apr. 16-20, 2018, 4 pages.

* cited by examiner (a)

(b)

METHOD FOR TRANSMITTING AND RECEIVING CHANNEL STATE INFORMATION BETWEEN TERMINAL AND BASE STATION IN WIRELESS COMMUNICATION SYSTEM AND APPARATUS SUPPORTING SAME

CROSS-REFERENCE TO RELATED APPLICATIONS

This application is a National Stage application under 35 U.S.C. § 371 of International Application No. PCT/KR2019/005185, filed on Apr. 30, 2019, which claims the benefit of Korean Application No. 10-2019-0030901, filed on Mar. 19, 2019, and Korean Application No. 10-2018-0049667, filed on Apr. 30, 2018. The disclosures of the prior applications are incorporated by reference in their entirety.

TECHNICAL FIELD

The present disclosure relates to a wireless communication system and, more particularly, to a method of transmitting and receiving channel state information between a terminal and a base station in a wireless communication system and apparatuses for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced.

Thus, the new generation RAT considering eMBB communication, massive MTC, ultra-reliable and low-latency communication (URLLC), etc. have been introduced.

DISCLOSURE

Technical Problem

The object of the present disclosure is to provide a method of transmitting and receiving channel state information between a terminal and a base station in a wireless communication system and apparatuses for supporting the same.

The technical objects that can be achieved through the present disclosure are not limited to what has been particularly described hereinabove and other technical objects not described herein will be more clearly understood by persons skilled in the art from the following detailed description.

Technical Solution

The present disclosure provides a method of transmitting and receiving channel state information between a user equipment and a base station in a wireless communication system and apparatuses for supporting the same.

In one aspect of the present disclosure, a method of reporting channel state information (CSI) by a user equipment (UE) in a wireless communication system is provided. The method may include: receiving configuration information related to a first channel state information reference signal (CSI-RS) resource for measurement, wherein the configuration information may include quasi co-location (QCL) information between the first CSI-RS resource and a second CSI-RS resource related to a neighboring cell; receiving a CSI-RS transmitted from the neighboring cell based on the configuration information; and reporting the CSI measured based on the received CSI-RS to a serving cell.

In the present disclosure, receiving, by the UE, the CSI-RS from the neighboring cell may include receiving, by the UE, the CSI-RS from the neighboring cell based on the timing of the CSI-RS determined based on the QCL information and the configuration information.

For example, when synchronization signal block (SSB) information related to the second CSI-RS resource is configured, the timing of the CSI-RS may be determined with respect to a cell configured in relation to the second CSI-RS resource.

As another example, when the SSB information related to the second CSI-RS resource is not configured and reference serving cell information related to the second CSI-RS resource is configured, the timing of the CSI-RS may be determined with respect to a cell determined based on the reference serving cell information.

As a further example, when the SSB information related to the second CSI-RS resource is not configured and the reference serving cell information related to the second CSI-RS resource is not configured, the timing of the neighboring cell may be determined with respect to the serving cell connected to the UE.

In the present disclosure, the QCL information may include at least one of the following information.
  QCL type A information notifying that the first CSI-RS resource and the second CSI-RS resource are quasi co-located (QCL) in terms of a Doppler shift, a Doppler spread, an average delay and a delay spread
  QCL type B information notifying that that the first CSI-RS resource and the second CSI-RS resource are QCL in terms of the Doppler shift and the Doppler spread,
  QCL type C information notifying that that the first CSI-RS resource and the second CSI-RS resource are QCL in terms of the Doppler shift and the average delay
  QCL type D information notifying that that the first CSI-RS resource and the second CSI-RS resource are QCL in terms of a spatial reception (Rx) parameter.

When the QCL information includes the QCL type C information, receiving the CSI-RS transmitted from the neighboring cell based on the QCL information may include receiving the CSI-RS transmitted from the neighboring cell based on Doppler shift information and average delay information related to the second CSI-RS resource.

When the QCL information includes the QCL type D information, receiving the CSI-RS transmitted from the neighboring cell based on the QCL information may include receiving the CSI-RS transmitted from the neighboring cell based on Rx beam information related to the second CSI-RS resource.

When the QCL information includes the QCL type C information and the QCL type D information, receiving the CSI-RS transmitted from the neighboring cell based on the QCL information may include receiving the CSI-RS transmitted from the neighboring cell based on the Doppler shift information, average delay information, and Rx beam information related to the second CSI-RS resource.

In the present disclosure, the CSI-RS may be received from the neighboring cell based on a resource configuration related to the first CSI-RS resource.

Alternatively, the CSI-RS may be received from the neighboring cell based on a resource configuration related to the second CSI-RS resource.

In this case, the resource configuration related to the second CSI-RS resource may include at least one of the following resource configurations.

A time resource configuration related to the second CSI-RS resource

A frequency resource configuration related to the second CSI-RS resource

A numerology configuration related to the second CSI-RS resource.

Further, the CSI-RS may be received from the neighboring cell based on a resource configuration satisfying both a first resource configuration related to the first CSI-RS resource and a second resource configuration related to the second CSI-RS resource.

For example, the CSI-RS may be received from the neighboring cell based on a frequency resource in which a first frequency resource related to the first CSI-RS resource included in the first resource configuration overlaps with a second frequency resource related to the second CSI-RS resource included in the second resource configuration.

In the present disclosure, the configuration information may be received through higher layer signaling.

In the present disclosure, the first CSI-RS resource may be a non-zero power (NZP) CSI-RS resource or a channel state information interference measurement (CSI-IM) resource.

In the present disclosure, the second CSI-RS resource may be a CSI-RS resource for radio resource management (RRM).

In another aspect of the present disclosure, a UE for reporting CSI in a wireless communication system is provided. The UE may include: at least one radio frequency (RF) module; at least one processor; and at least one memory operably connected to the at least one processor and storing instructions that, when executed, cause the at least one processor to perform the following operations. The operations may include: receiving configuration information related to a first CSI-RS resource for measurement by controlling the at least one RF module, wherein the configuration information may include QCL information between the first CSI-RS resource and a second CSI-RS resource related to a neighboring cell; receiving a CSI-RS transmitted from the neighboring cell based on the configuration information by controlling the at least one RF module; and reporting the CSI measured based on the received CSI-RS to a serving cell by controlling the at least one RF module.

In this case, the UE may be configured to communicate with at least one of a mobile terminal, a network, and an autonomous driving vehicle except a vehicle including the UE.

In a further aspect of the present disclosure, a base station for receiving CSI in a wireless communication system is provided. The base station may include at least one RF module; at least one processor; and at least one memory operably connected to the at least one processor and storing instructions that, when executed, cause the at least one processor to perform the following operations. The operations may include: transmitting configuration information related to a first CSI-RS resource for measurement to a UE by controlling the at least one RF module, wherein the configuration information may include quasi co-location information between the first CSI-RS resource and a second CSI-RS resource related to a neighboring cell; and receiving the CSI measured by the UE by controlling the at least one RF module, wherein the CSI may include measurement information for a CSI-RS transmitted from the neighboring cell to the UE based on the configuration information.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, a user equipment (UE) may measure a channel state information reference signal (CSI-RS) transmitted from a neighboring (or neighbor) cell rather than a serving cell that currently provides services and report CSI therefor to the serving cell.

Based on the CSI for the neighboring cell, a network (or the serving cell) may control interference from the neighboring cell to the UE or improve the reception performance of the UE for the neighboring cell (if the UE is served by both the serving cell and the neighboring cell).

In particular, according to the configurations according to the present disclosure, it may be supported that the UE reports the CSI for the neighboring cell with minimum modification in the current 3GPP 5G NR specifications.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

DESCRIPTION OF DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

BEST MODE

Figure 1:
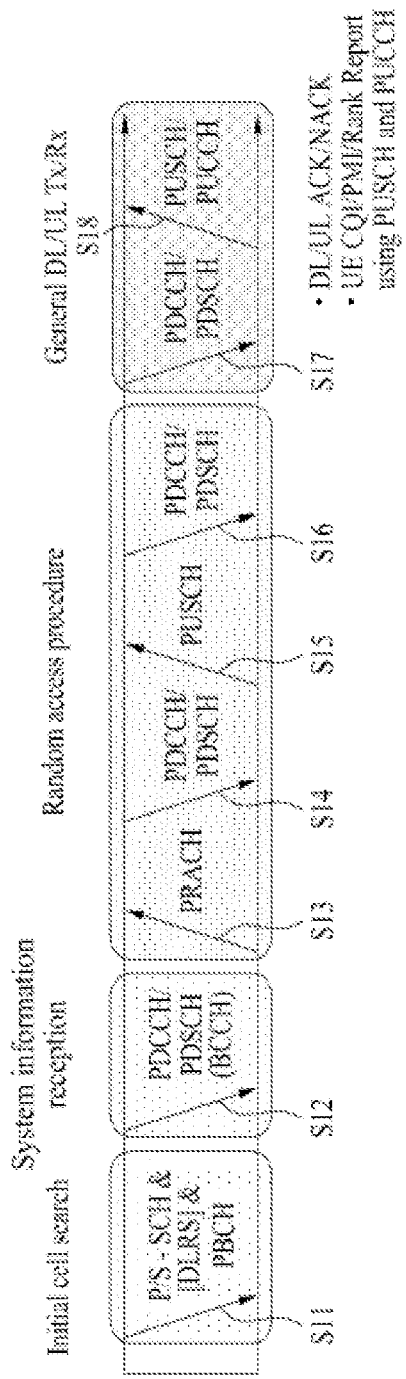
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term UE may be replaced with a UE, a Mobile Station (MS), a Subscriber Station (SS), a Mobile Subscriber Station (MSS), a mobile UE, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System 1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
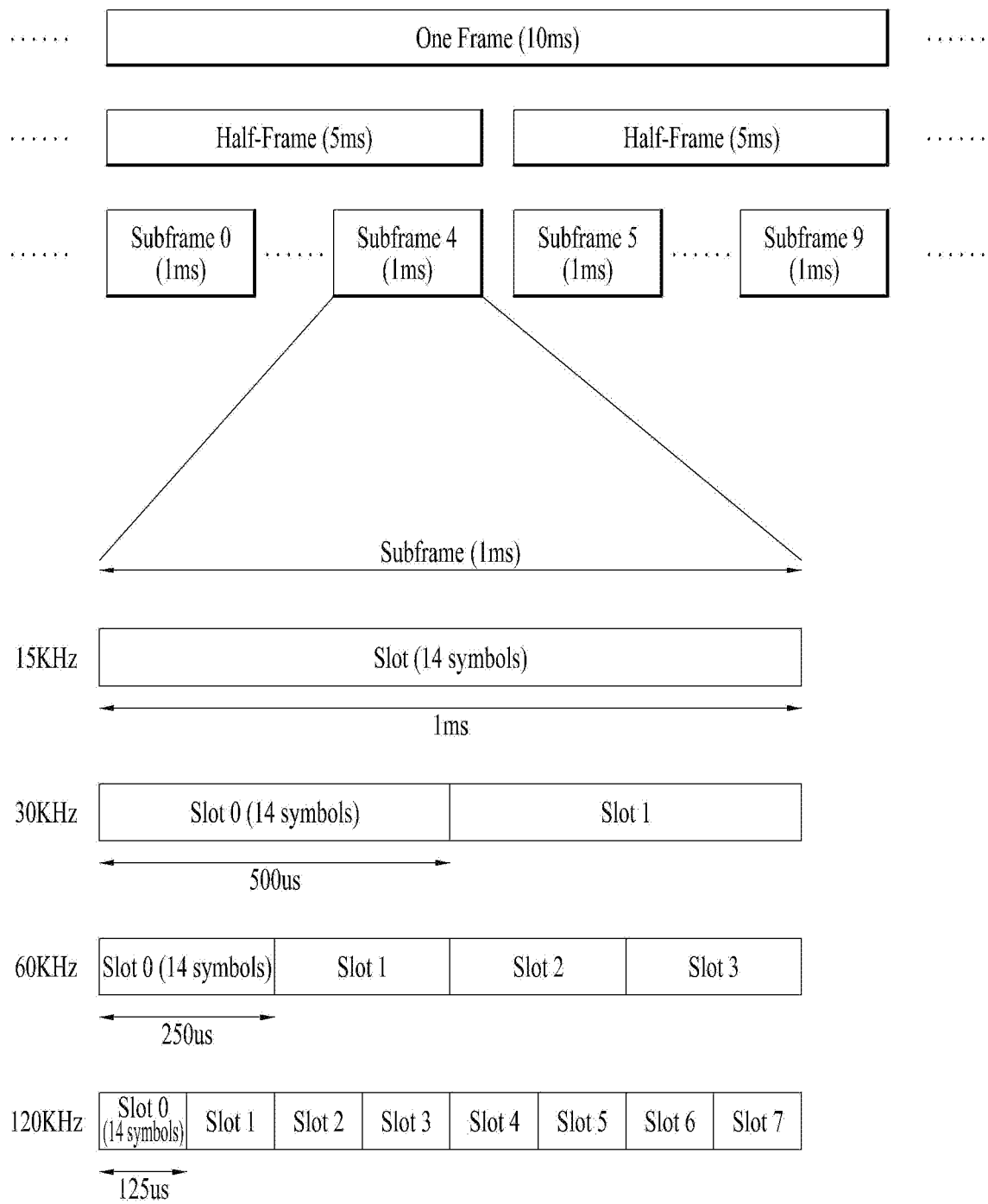
FIG. 2 is a diagram illustrating a radio frame structure in an NR system to which embodiments of the present disclosure are applicable.

FIG. 2 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

Figure 3:
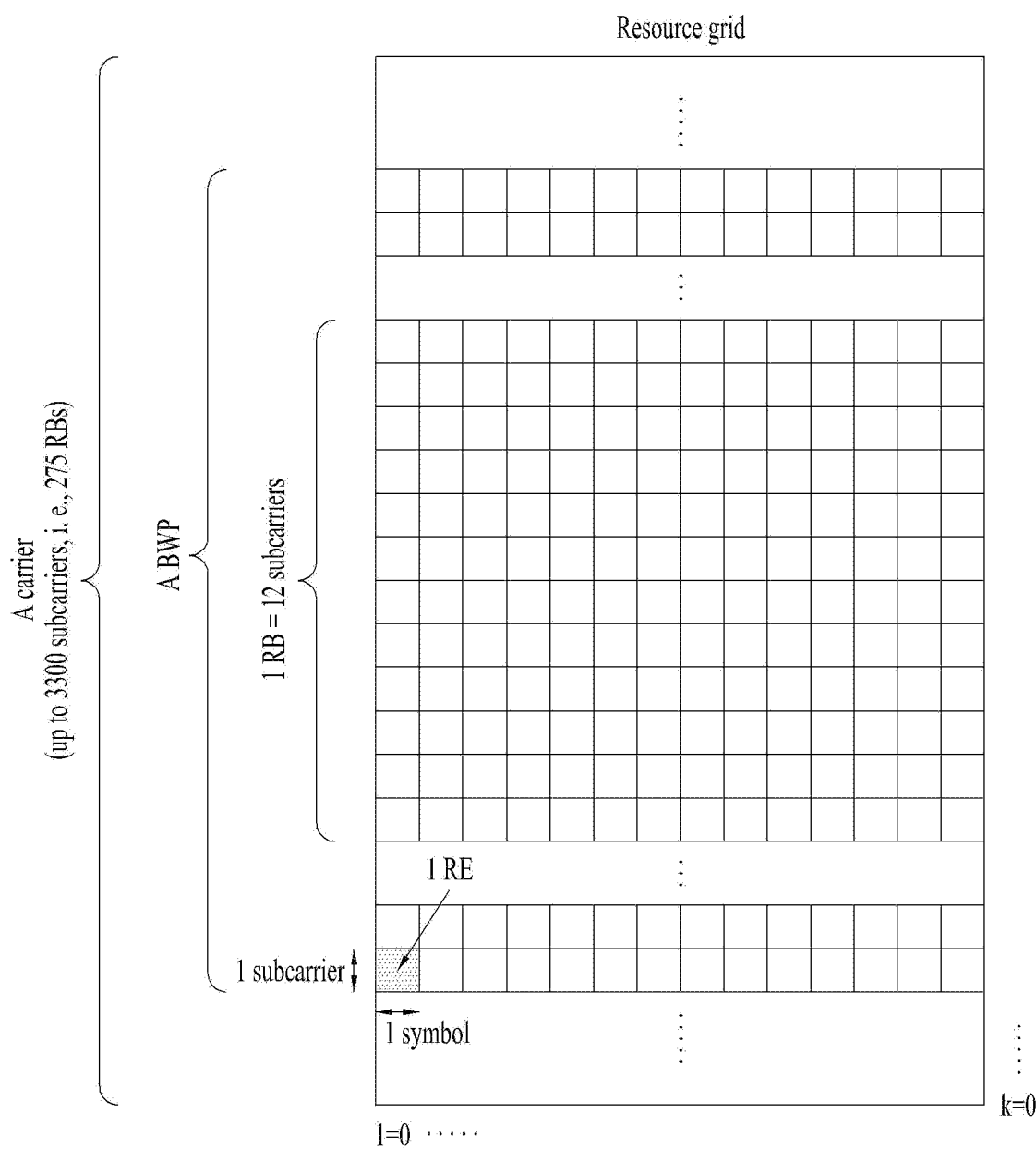
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
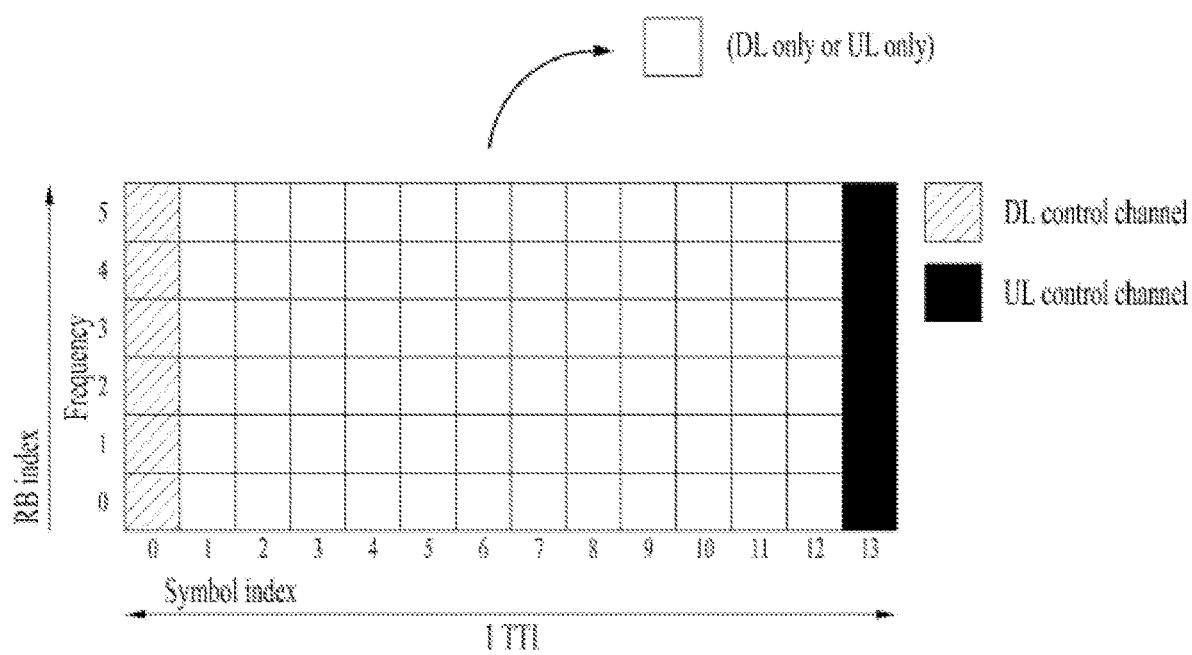
FIG. 4 is a diagram illustrating a self-contained slot structure in an NR system to which embodiments of the present disclosure are applicable.

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Figure 5:
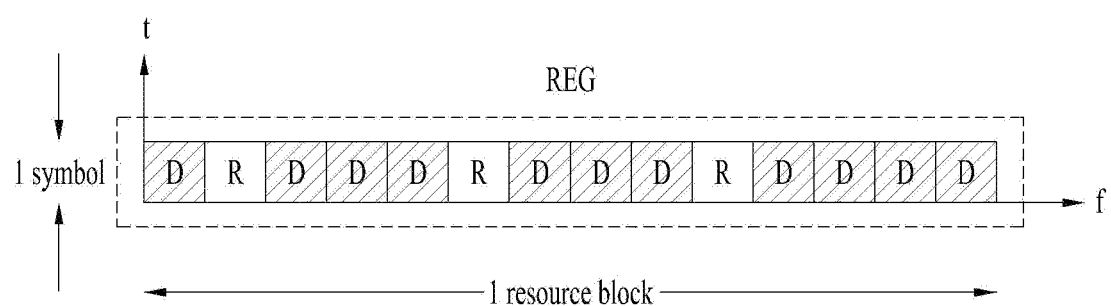
FIG. 5 is a diagram illustrating the structure of one REG in an NR system to which embodiments of the present disclosure are applicable.

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 5.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSC in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 3 lists exemplary PUCCH formats.

TABLE 3

| PUCCH format | Length in OFDM symbols $N_{symb}^{PUCCH}$ | Number of bits | Usage | Etc |
| --- | --- | --- | --- | --- |
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |

TABLE 3-continued

| PUCCH format | Length in OFDM symbols $N_{symb}^{PUCCH}$ | Number of bits | Usage | Etc |
| --- | --- | --- | --- | --- |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of 1/3. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 6:
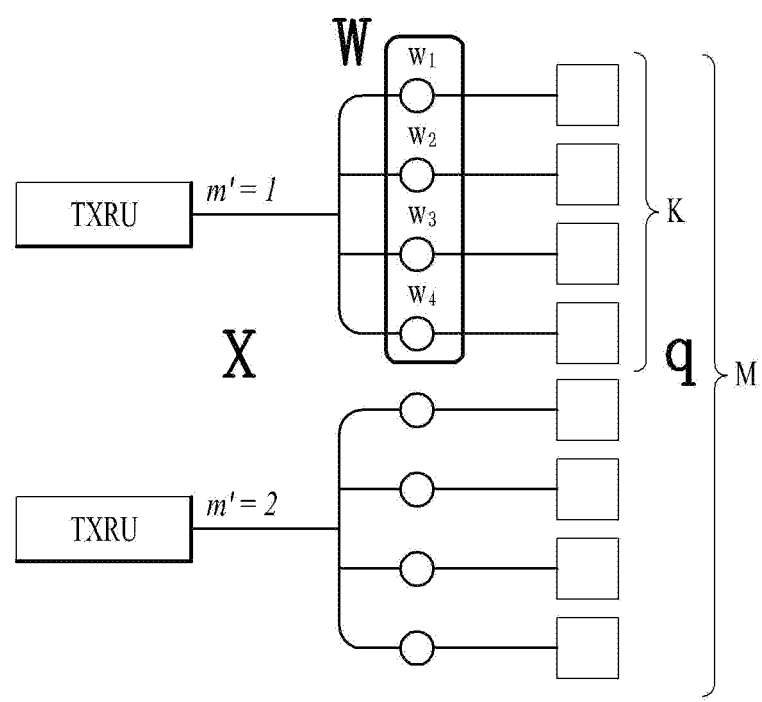
FIGS. 6 and 7 are diagrams illustrating representative methods for connecting TXRUs to antenna elements.
Figure 7:
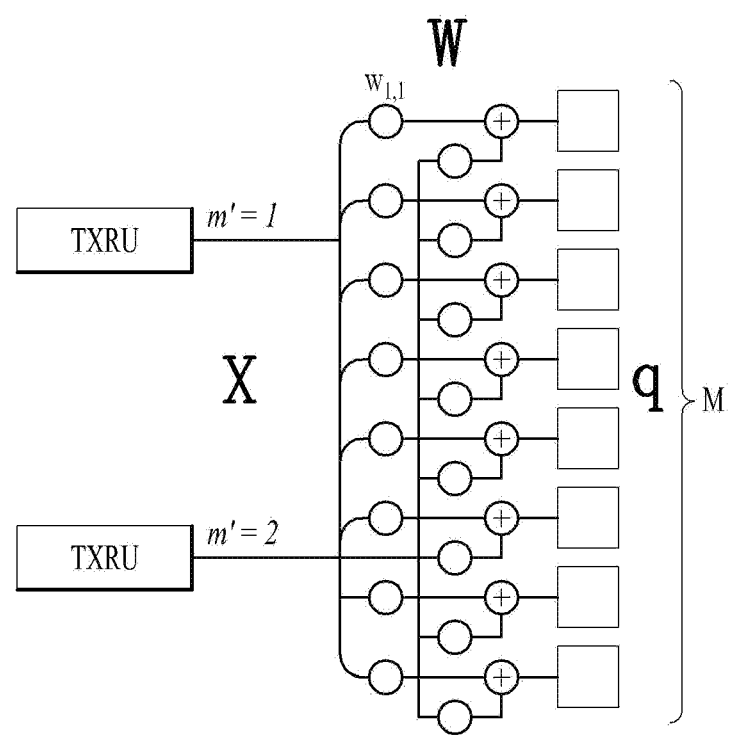

FIGS. 6 and 7 are diagrams illustrating representative methods for connecting TXRUs to antenna elements. Here, the TXRU virtualization model represents the relationship between TXRU output signals and antenna element output signals.

FIG. 6 shows a method for connecting TXRUs to subarrays. In FIG. 6, one antenna element is connected to one TXRU.

Meanwhile, FIG. 7 shows a method for connecting all TXRUs to all antenna elements. In FIG. 7, all antenna elements are connected to all TXRUs. In this case, separate addition units are required to connect all antenna elements to all TXRUs as shown in FIG. 7.

In FIGS. 6 and 7, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 6 has a disadvantage in that it is difficult to achieve beamforming focusing but has an advantage in that all antennas can be configured at low cost.

On the contrary, the configuration shown in FIG. 7 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N transceiver units (TXRUs) and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 8:
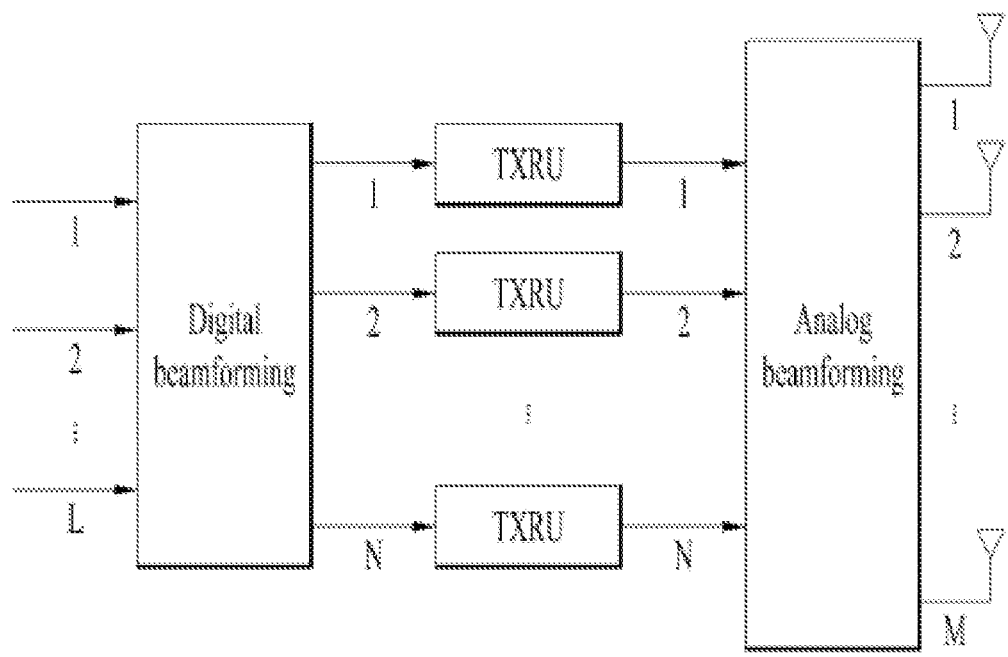
FIG. 8 is a diagram schematically illustrating an exemplary hybrid BF structure from the perspective of TXRUs and physical antennas according to the present disclosure.

FIG. 8 is a diagram schematically illustrating an exemplary hybrid BF structure from the perspective of TXRUs and physical antennas according to the present disclosure. In FIG. 8, the number of digital beams is L and the number analog beams is N.

Figure 11:
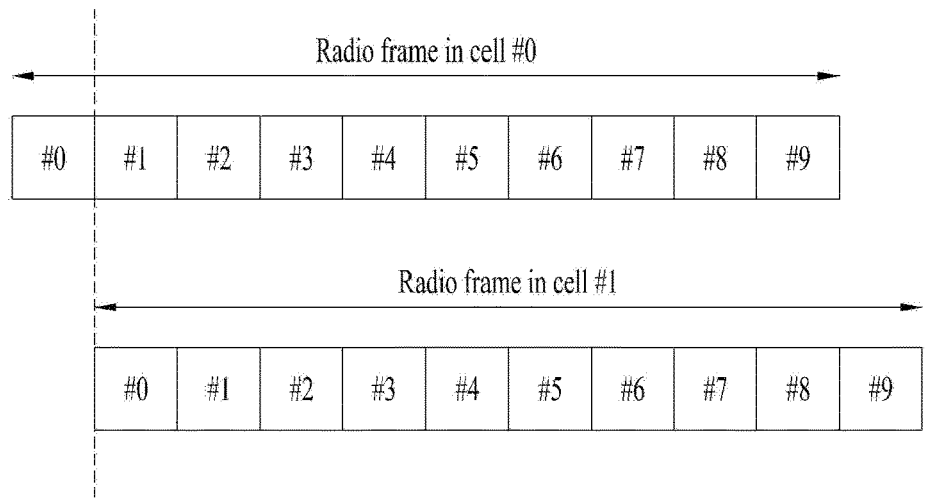
FIG. 11 is a diagram schematically illustrating radio frame structures of two cells (base stations, carriers, etc.) applicable to the present disclosure.

Additionally, in the NR system to which the present disclosure is applicable, a BS designs analog BF to be changed in units of symbols to provide more efficient BF support to a UE located in a specific area. Furthermore, as illustrated in FIG. 11, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe (SF) or slot on a symbol-by-symbol basis so that all UEs may have reception opportunities.

Figure 9:
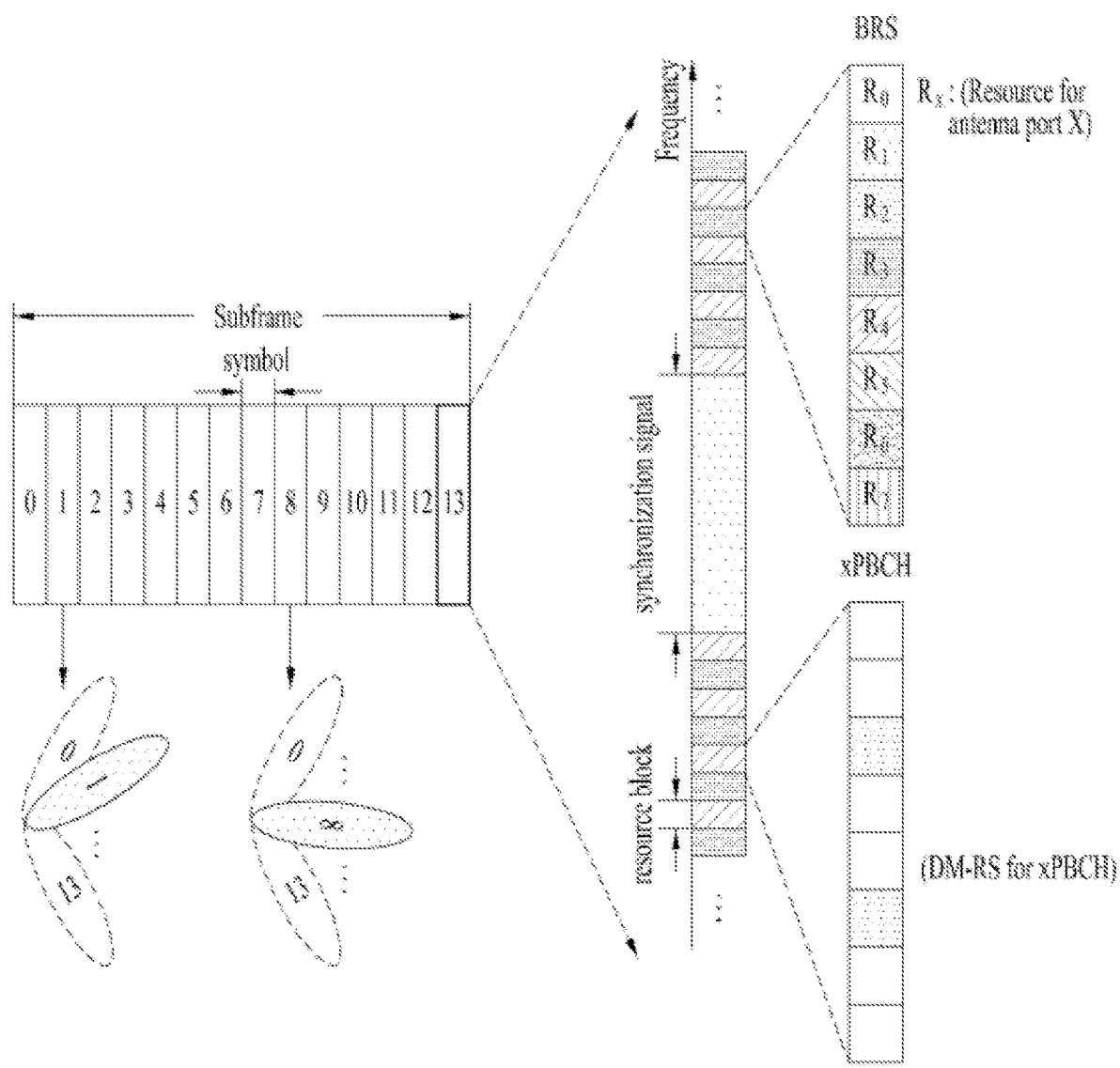
FIG. 9 is a diagram schematically illustrating an exemplary beam sweeping operation for a synchronization signal and system information in a DL transmission procedure according to the present disclosure.

FIG. 9 is a diagram schematically illustrating an exemplary beam sweeping operation for a synchronization signal and system information in a DL transmission procedure according to the present disclosure.

In FIG. 9 below, a physical resource (or physical channel) on which the system information of the NR system to which the present disclosure is applicable is transmitted in a broadcasting manner is referred to as an xPBCH. Here, analog beams belonging to different antenna panels within one symbol may be simultaneously transmitted.

As illustrated in FIG. 9, in order to measure a channel for each analog beam in the NR system to which the present disclosure is applicable, introducing a beam RS (BRS), which is a reference signal (RS) transmitted by applying a single analog beam (corresponding to a specific antenna panel), is being discussed. The BRS may be defined for a plurality of antenna ports and each antenna port of the BRS may correspond to a single analog beam. In this case, unlike the BRS, a synchronization signal or the xPBCH may be transmitted by applying all analog beams in an analog beam group such that any UE may receive the signal well.

1.4. Demodulation Reference Signal (DMRS)

In the NR system to which the present disclosure is applicable, a DMRS may be transmitted and received in a front-loaded structure. Alternatively, an additional DMRS may be transmitted and received in addition to the front-loaded DMRS.

The front-loaded DMRS may support fast decoding. The first OFDM symbol in which the front-loaded DMRS is carried may be determined as the third (e.g., 1=2) or fourth (e.g., 1=3) OFDM symbol. The first OFDM symbol position may be indicated by a PBCH.

The number of OFDM symbols in which the front-loaded DMRS is occupied may be indicated by a combination of DCI and radio resource control (RRC) signaling.

The additional DMRS may be configured for a high-speed UE. The additional DMRS may be positioned in the middle/last symbol(s) in a slot. If one front-loaded DMRS is configured, the additional DMRS may be allocated to 0 to 3 OFDM symbols. If two front-loaded DMRS symbols are configured, the additional DMRS may be allocated to 0 to 2 OFDM symbols.

The front-loaded DMRS may be divided into two types and one of the two types may be indicated through higher layer signaling (e.g., RRC signaling).

FIG. 8 is a diagram schematically illustrating two DMRS configuration types applicable to the present disclosure.

In FIG. 8, P0 to P11 may correspond to port numbers 1000 to 1011, respectively. Among of the two DMRS configuration types, a DMRS configuration type that is actually configured for a UE may be indicated by higher layer signaling (e.g., RRC signaling).

DMRS configuration type 1 may be subdivided as follows depending on the number of OFDM symbols allocated for the front-loaded DMRS.

DMRS Configuration Type 1 and Number of OFDM Symbols to which the Front-Loaded DMRS is Allocated=1

Up to 4 ports (e.g., P0 to P3) may be multiplexed based on length-2 frequency code division multiplexing (F-CDM) and frequency division multiplexing (FDM) schemes. RS density may be set to 6 REs per port in a resource block (RB).

DMRS Configuration Type 1 and Number of OFDM Symbols to which the Front-Loaded DMRS is Allocated=2

Up to 8 ports (e.g., P0 to P7) may be multiplexed based on length-2 F-CDM, length-2 time CDM (T-CDM), and FDM schemes. If presence of a PT-RS is configured by higher layer signaling, T-CDM may be fixed to [1 1]. RS density may be set to 12 REs per port in the RB.

DMRS configuration type 2 may be classified as follows according to the number of OFDM symbols to which the front-loaded DMRS is allocated.

DMRS Configuration Type 2 and Number of OFDM Symbols to which the Front-Loaded DMRS is Allocated=1

Up to 6 ports (e.g., P0 to P5) may be multiplexed based on length-2 F-CDM and FDM schemes. RS density may be set to 4 REs per port in the RB.

DMRS Configuration Type 2 and Number of OFDM Symbols to which the Front-Loaded DMRS is Allocated=2

Up to 12 ports (e.g., P0 to P11) may be multiplexed based on length-2 F-CDM, length-2 T-CDM, and FDM schemes. If presence of the PT-RS is configured by higher layer signaling, T-CDM may be fixed to [1 1]. RS density may be set to 8 REs per port in the RB.

Figure 10:
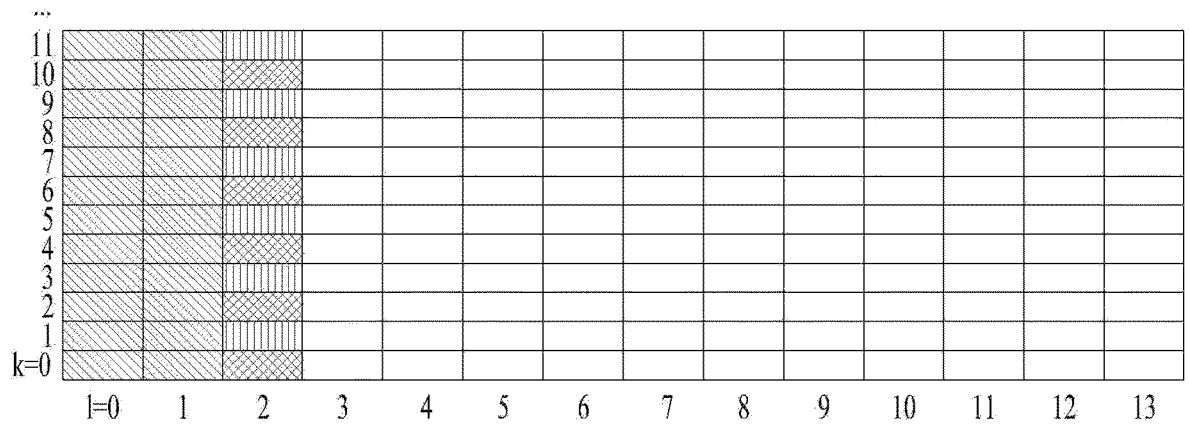
FIG. 10 is a diagram schematically illustrating an example of a front loaded DMRS of a first DMRS configuration type applicable to the present disclosure.
Figure 10:
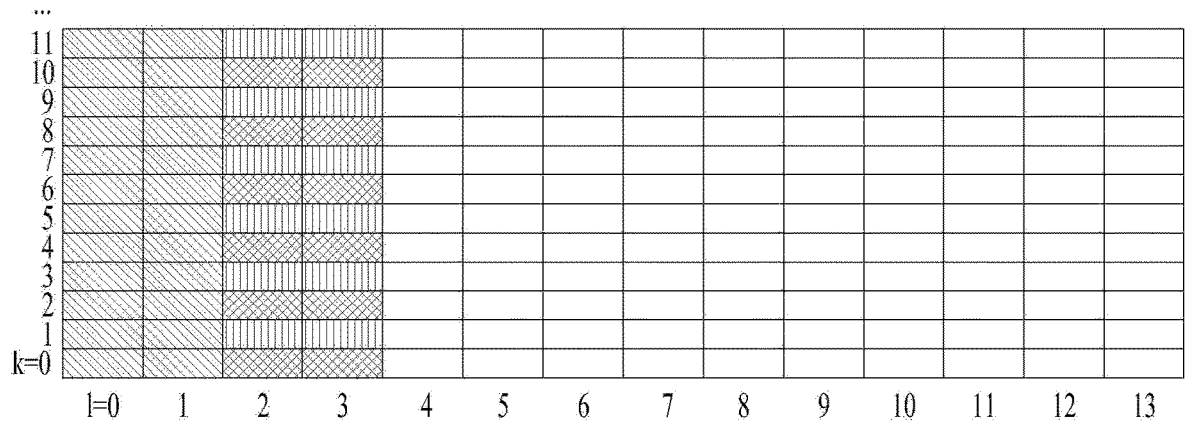

FIG. 10 is a diagram schematically illustrating an example of a front loaded DMRS of a first DMRS configuration type applicable to the present disclosure.

More specifically, FIG. 10($a$) illustrates a front-loaded DMRS with one symbol and FIG. 10($b$) illustrates a front-loaded DMRS with two symbols.

In FIG. 10, A represents a DMRS offset value on the frequency axis. In this case, DMRS ports having the same DMRS offset A may be subjected to code division multiplexing in the frequency domain (CDM-F) or code division multiplexing in the time domain (CDM-T). In addition, DMRS ports having different DMRS offsets A may be subjected to CDM-F.

A UE may obtain DMRS port configuration information configured by a BS from DCI.

1.5. DMRS Port Group

In the present disclosure, a DMRS port group may refer to a set of DMRS ports that are quasi co-located (QCL) or partially QCL with each other. Herein, quasi co-location (QCL) may mean that long-term channel parameters such as a Doppler spread, a Doppler shift, an average delay, a delay spread, etc. are assumed to be the same, and partial QCL may mean that some of the long-term channel parameters are assumed to be the same.

1.6. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.7. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.8. Antenna Port Quasi Co-Location

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi co-location (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot #(n+3*$N^{subframe,\mu}_{slot}$+1) In this case, $N^{subframe,\mu}_{slot}$ is determined based on Table 1 or Table 2 described above. After the UE receives initial higher layer configuration of TCI states and before the UE receives the activation command, the UE assumes that DM-RS port(s) of a PDSCH of a serving cell are quasi co-located with an SS/PBCH block determined in the initial access procedure with respect to 'QCL-TypeA'. Additionally, the UE may assume that the DM-RS port(s) of the PDSCH of the serving cell are quasi co-located with the SS/PBCH block determined in the initial access procedure also with respect to 'QCL-TypeD' at the above timing.

If a higher layer parameter tci-PresentInDCI is set as 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between the reception of the DL DCI and the reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set as 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are quasi co-located with RS(s) in the TCI state with respect to QCL type parameter(s) given by an indicated TCI state if the time offset between the reception of the DL DCI and the reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDci is set as 'enabled' for the CORESET. If one or more of the TCI states configured for the serving cell scheduled by the search space set contains 'QCL-TypeD', the UE expects the time offset between the reception of the detected PDCCH in the search space set and the reception of the corresponding PDSCH is greater than or equal to the threshold timeDurationForQCL.

For both the cases when higher layer parameter tci-PresentInDCI is set to 'enabled' and the higher layer parameter tci-PresentInDCI is not configured in RRC connected mode, if the offset between the reception of the DL DCI and the reception of the corresponding PDSCH is less than the threshold Threshold-Sched-Offset, the UE makes the following assumptions. (i) DM-RS ports of a PDSCH of a serving cell are quasi co-located with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DM-RS is different from 'QCL-TypeD' of a PDCCH DM-RS with which overlapping occurs in at least one symbol, the UE is expected to prioritize the reception of the ePDCCH associated with the corresponding CORESET. This operation may also be applied to an intra-band CA case (when the PDSCH and the CORESET are in different CCs). If none of configured TCI states contains 'QCL-TypeD', the UE obtains the other QCL assumptions from the indicated TCI states for a scheduled PDSCH irrespective of the time offset between the reception of the DL DCI and the reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):
 'QCL-TypeC' with an SS/PBCH block and, when (QCL-TypeD) is applicable, 'QCL-TypeD' with the same SS/PBCH block, or
 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with higher layer parameter repetition, For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):
 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with the same CSI-RS resource, or
 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with an SS/PBCH, or
 'QCL-TypeA' with a CSI-RS resource in the higher layer parameter NZP-CSI-RS-ResourceSet configured with the higher layer parameter trs-Info and, when (QCL-TypeD is) applicable, 'QCL-TypeD' with a periodic CSI-RS resource in the higher layer parameter NZP-CSI-RS-ResourceSet configured with the higher layer parameter repetition, or
 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):
 'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or
 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or
 'QCL-TypeC' with an SS/PBCH block and, when (QCL-TypeD) is applicable, 'QCL-TypeD' with the same SS/PBCH block.

For the DM-RS of PDCCH, the UE should assume that a TCI state indicates one of the following QCL type(s):
 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
 'QCL-TypeA' with a CSI-RS resource in the higher layer parameter NZP-CSI-RS-ResourceSet configured with higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
 'QCL-TypeA' with a CSI-RS resource in the higher layer parameter NZP-CSI-RS-ResourceSet configured without higher layer parameter trs-Info and without the higher layer parameter repetition and, when (QCL-TypeD) is applicable, 'QCL-TypeD' with the same CSI-RS resource.

For the DM-RS of the PDSCH, the UE should assume that a TCI state indicates one of the following QCL type(s):
 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or
 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or
 QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

Additionally, the UE and BS according to the present disclosure may operate as follows.

TABLE 4

| QCL linkage for above 6 GHz after RRC | signalling |
|---|---|
| SSB → TRS w.r.t average delay, Doppler shift, spatial RX parameters | QCL type: C + D |
| TRS → CSI-RS for BM w.r.t. average delay, Doppler shift, delay spread, Doppler spread estimation | QCL type: A + D |
| TRS → CSI-RS for CSI w.r.t. average delay, Doppler shift, delay spread, Doppler spread estimation | QCL type: A |
| TRS → DMRS for PDCCH w.r.t. average delay, Doppler shift, delay spread, Doppler spread estimation | QCL type: A + D |
| TRS → DMRS for PDSCH w.r.t. average delay, Doppler shift, delay spread, Doppler spread estimation | QCL type: A + D |
| SSB → CSI-RS for BM w.r.t average delay, Doppler shift, spatial RX parameters | QCL type: C + D |
| SSB → CSI-RS for CSI w.r.t, spatial RX parameters | QCL type: D |
| SSB → DMRS for PDCCH (before TRS is configured) w.r.t. average delay, Doppler shift, delay spread, Doppler spread, spatial RX parameters | QCL type: A + D |
| SSB → DMRS for PDSCH (before TRS is configured) w.r.t. average delay, Doppler shift, delay spread, Doppler spread, spatial RX parameters | QCL type: A + D |
| CSI-RS for BM → DMRS for PDCCH w.r.t. spatial RX parameters | QCL type: D |
| CSI-RS for BM → DMRS for PDSCH w.r.t., spatial RX parameters | QCL type: D |
| CSI-RS for CSI → DMRS for PDSCH w.r.t. average delay, Doppler shift, delay spread, Doppler spread, spatial RX parameters; Note: QCL parameters may not be derived directly from CSI-RS for CSI | QCL type: A + D |
| CSI-RS for BM → CSI-RS for TRS/BM/CSI w.r.t. spatial RX parameters | QCL type: D |

Specifically, the QCL linkage and signaling shown in Table 4 may be applied between the UE and BS according to the present disclosure after the UE establishes an RRC connection. In the present disclosure, the above operations may be applied not only to bands above 6 GHz but also to bands below 6 GHz.

In the following description, if one row in the tables below has the same RS type, the same RS ID may be assumed for the row.

In the present disclosure, when a CSI-RS resource is included in the higher layer parameter NZP-CSI-RS-ResourceSet in which the higher layer parameter trs-Info is configured, the UE expects the following two possible configurations for a higher layer parameter TCI-state.

TABLE 5

| Valid TCI state Configuration | DL RS 1 | qd-Type1 | DL RS 2 (if configured) | qcl-Type2 (if configured) |
|---|---|---|---|---|
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 5, *represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter trs-Info and the higher layer parameter repetition are not configured, the UE expects the following three possible configurations for the higher layer parameter TCI-state.

TABLE 6

| Valid TCI state Configuration | DL RS 1 | qcl-Type1 | DL RS 2 (if configured) | qcl-Type2 (if configured) |
|---|---|---|---|---|
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4* | TRS | QCL-TypeB | | |

In Table 6, *represents a case in which QCL type-D is not applicable.
In Table 6, **represents a case in which QCL type-D is applicable. When QCL type-D is applicable, DL RS 2 and QCL type-2 need to be configured for the UE.

In the present disclosure, when a CSI-RS resource is included in the higher layer parameter NZP-CSI-RS-ResourceSet in which the higher layer parameter repetition is configured, the UE expects the following three possible configurations for the higher layer parameter TCI-state.

TABLE 7

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

In Tables 8 and 9 below, if QCL type-D is applicable, DL RS 2 and QLC type-2 need to be configured for the UE except a default case (e.g., the fourth row in Tables 8 and 9). When a TRS for DL is used for QCL type-D, the TRS is a source RS for QCL type-D and thus needs to have an SS/PBCH block or CSI-RS.

For a PDCCH DMRS, the UE expects the following three possible configurations for the higher layer parameter TCI-state. The fourth configuration is a default configuration and valid before the TRS is configured.

TABLE 8

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 8, * represents that the TRS is not configured yet. In this case, the configuration may be a valid QCL assumption rather than a TCI state.
In Table 8, ** represents that QCL parameters may not be directly derived fro, CSI-RS(s) (CSI).

For a PDSCH DMRS, the UE expects the following three possible configurations for the higher layer parameter TCI-state. The fourth configuration is a default configuration and valid before the TRS is configured.

TABLE 9

| Valid TCI state Configuration | DL RS 1 | qcl-Type1 | DL RS 2 (if configured) | qd-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 9, * represents that the TRS is not configured yet. In this case, the configuration may correspond to a valid QCL assumption rather than a TCI state.
In Table 9, ** represents that QCL parameters may not be directly derived from CSI-RS(s) (CSI).

Hereinafter, a description will be given of how higher layer parameters used for the above operations are configured.

A higher layer parameter CSI-ResourceConfig applicable to the present disclosure may be configured as follows. The parameter may include at least one higher layer parameter NZP-CSI-RS-ResourceSet, at least one higher layer parameter CSI-IM-ResourceSet and/or at least one higher layer parameter CSI-SSB-ResourceSet.

TABLE 10

CSI-ResourceConfig information element

```
-- ASN1START
-- TAG-CSI-RESOURCECONFIG-START
CSI-ResourceConfig ::=    SEQUENCE {
    csi-ResourceConfigId        CSI-ResourceConfigId,
    csi-RS-ResourceSetId        CHOICE {
        nzp-CSI-RS-SSB              SEQUENCE {
            nzp-CSI-RS-ResourceSetList    SEQUENCE (SIZE (1..maxNrofNZP-CSI-RSResourceSetsPerConfig)) OF NZP-CSI-RS-ResourceSetId
                                                                            OPTIONAL, -- Need R
            csi-SSB-ResourceSetList       SEQUENCE (SIZE(1..maxNrofCSI-SSBResourceSetsPerConfig)) OF CSI-SSB-ResourceSetId
                                                                            OPTIONAL -- Need R
        },
        csi-IM-ResourceSetList       SEQUENCE (SIZE (1..maxNrofCSI-IMResourceSetsPerConfig)) OF CSI-IM-ResourceSetId
    },
    bwp-Id              BWP-Id,
    resourceType        ENUMERATED { aperiodic, semiPersistent, periodic },
    ...
}
-- TAG-CSI-RESOURCECONFIG-STOP
-- ASN1STOP
```

Each field included in the parameter may be defined as follows.

TABLE 11

CSI-ResourceConfig field descriptions bwp-Id
The DL BWP which the CSI-RS associated with this CSI-ResourceConfig are located in (see TS 38.214 [19], clause 5.2.1.2.
csi-IM-ResourceSetList
List of references to CSI-IM resources used for CSI measurement and reporting in a CSI-RS resource set. Contains up to maxNrofCSI-IM-ResourceSetsPerConfig resource sets if resourceType is 'aperiodic' and 1 otherwise (see TS 38.214 [19], clause 5.2.1.2).
csi-ResourceConfigId
Used in CSI-ReportConfig to refer to an instance of CSI-ResourceConfig.
csi-SSB-ResourceSetList
List of references to SSB resources used for CSI measurment and reporting in a CSI-RS resource set (see TS 38.214 [19], clause 5.2.1.2).
nzp-CSI-RS-ResourceSetList
List of references to NZP CSI-RS resource used for beam measurement and reporting in a CSI-RS resource set. Contains up to maxNrofNZP-CSI-RS-ResourceSetsPerConfig resource sets if resourceType is 'aperiodic' and 1 otherwise (se TS 38.214 [19], clause 5.2.1.2).
resourceType
Time domain behavior of resource configuration (see TS 38.214 [19], clause 5.2.1.2). It does not apply to resources provided in the csi-SSB-ResourceSetList.

The higher layer parameter NZP-CSI-RS-ResourceSet applicable to the present disclosure may be configured as follows. The parameter may include at least one higher layer parameter NZP-CSI-RS-Resource.

Each field included in the parameter may be defined as follows.

TABLE 13

NZP-CSI-RS-ResourceSet field descriptions aperiodicTriggeringOffset, aperiodicTriggeringOffset-r16
Offset X between the slot containing the DCI that triggers a set of aperiodicNZP CSI-RS resources and the slot in which the CSI-RS resource set is transmitted. For aperiodicTriggeringOffset.the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodic-TriggeringOffset-r16, the value indicates the number of slots. The network configures only one of the fields. When neither field is included, the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set
repetition
Indicates whether repetition is on/off. If the field is set to off or if the feild is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP, L1 SINR or "no report".
trs-Info
Indicates that the antenna port for all NZP-CSI-RS resources in the CSI-RS resource set is same. If the field is absent or released the UE applies the value false (see TS 38.214 [19], clause 5.2.2.3.1).

TABLE 12

NZP-CSI-RS-ResourceSet information element

```
-- ASN1START
-- TAG-NZP-CSI-RS-RESOURCESET-START
NZP-CSI-RS-ResourceSet ::=    SEQUENCE {
    nzp-CSI-ResourceSetId        NZP-CSI-RS-ResourceSetId,
    nzp-CSI-RS-Resources         SEQUENCE (SIZE (1..maxNrofNZP-CSI-RSResourcesPerSet)) OF NZP-CSI-RS-ResourceId,
    repetition                   ENUMERATED ( on, off )              OPTIONAL,    -- Need S
    aperiodicTriggeringOffset    INTEGER(0..6)                       OPTIONAL,    -- Need S
    trs-Info                     ENUMERATED (true)                   OPTIONAL,    -- Need R
    ...,
}
-- TAG-NZP-CSI-RS-RESOURCESET-STOP
-- ASN1STOP
```

The higher layer parameter NZP-CSI-RS-Resource applicable to the present disclosure may be configured as follows.

TABLE 14

NZP-CSI-RS-Resource information element

```
-- ASN1START
-- TAG-NZP-CSI-RS-RESOURCE-START
NZP-CSI-RS-Resource ::=      SEQUENCE {
    nzp-CSI-RS-ResourceId          NZP-CSI-RS-ResourceId,
    resourceMapping                CSI-RS-ResourceMapping,
    powerControlOffset             INTERGER (-8..15),
    powerControlOffsetSS           ENUMERATED(db-3, db0, db3, db6)    OPTIONAL,   -- Need R
    scramblingID                   ScramblingId
    periodicityAndOffset           CSI-ResourcePeriodicityAndOffset   OPTIONAL,   -- Cond PeriodicOrSemiPersistent
    qcl-InfoPeriodicityCSI-RS      TCI-StateId                        OPTIONAL,   -- CondPeriodic
    ..
}
-- TAG-NZP-CSI-RS-RESOURCE-STOP
-- ASN1STOP
```

Each field included in the parameter may be defined as follows.

TABLE 15

NZP-CSI-RS-Resource field descriptions periodicityAndOffset
Periodicity and slot offset sl1 corresponds to a periodicity of 1 slot, sl2 to a periodicity of two slots, and so on. The corresponding offset is also given in number of slots (see TS 38.214 [19], clause 5.2.2.3.1). Network always configures the UE with a value for this field for periodic and semi-persistent NZP-CSI-RS-Resource (as indicated in CSI-ResourceConfig).
powerControlOffset
Power offset of PDSCH RE to NZP CSI-RS RE. Value in dB (see TS 38.214 [19], clauses 5.2.2.3.1 and 4.1).
powerControlOffsetSS
Power offset of NZP CSI-RS RE to SSS RE. Value in dB (see TS 38.214 [19], clause 5.2.2.3.1).
qcl-InfoPeriodicCSI-RS
For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config in the BWP-Downlink corresponding to the serving cell and to the DL BWP to which the resource belongs to (see TS 38.214 [19], clause 5.2.2.3.1).
resourceMapping
OFDM symbol location(s) in a slot and subcarrier occupancy in a PRB of the CSI-RS resource.
scramblingID
Scrambling ID (see TS 38.214 [19], clause 5.2.2.3.1).

In the parameter, conditional presence may be defined as follows.

TABLE 16

| Conditional Presence | Explanation |
| --- | --- |
| Periodic | The field is optionally present, Need M, for periodic NZP-CSI-RS-Resources (as indicated in CSI-ResourceConfig). The field is absent otherwise. |
| PeriodicOrSemiPersistent | The field is optionally present, Need M, for periodic and semi-persistent NZP-CSI-RS-Resources (as indicated in CSI-ResourceConfig). The field is absent otherwise. |

The higher layer parameter CSI-IM-ResourceSet applicable to the present disclosure may be configured as follows. The parameter may include at least one higher layer parameter CSI-IM-resources IE.

TABLE 17

CSI-IM-ResourceSet information element

```
-- ASN1START
-- TAG-CSI-IM-RESOURCESET-START
CSI-IM-ResourceSet ::=     SEQUENCE {
    csi-IM-ResourceSetId       CSI-IM-ResourceSetId,
    csi-IM-Resources           SEQUENCE (SIZE(1..maxNrofCSI-IM-ResourcesPerSet)) OF CSI-IM-ResourceId,
    ...
}
-- TAG-CSI-IM-RESOURCESET-STOP
-- ASN1STOP
```

Each field included in the parameter may be defined as follows.

TABLE 18

CSI-IM-ResourceSet field descriptions csi-IM-Resources
CSI-IM-Resources associated with this CSI-IM-ResourceSet (see TS 38.214 [19], clause 5.2).

A higher layer parameter CSI-IM-Resource applicable to the present disclosure may be configured as follows.

TABLE 19

CSI-IM-Resource information element

```
-- ASN1START
-- TAG-CSI-IM-RESOURCE-START
CSI-IM-Resource ::=              SEQUENCE {
    csi-IM-ResourceId                CSI-IM-ResourceId,
    csi-IM-resourceElementPattern    CHOICE {
        pattern0                         SEQUENCE {
            subcarrierLocation-p0            ENUMERATED ( s0, s2, s4, s6, s8, s10 ),
            symbolLocation-p0                INTEGER (0..12)
        },
        pattern1                         SEQUENCE{
            subcarrierLocation-p1            ENUMERATED ( s0, s4, s6 ),
            symbolLocation-p1                INTEGER (0..13)
        }
    }                                                        OPTIONAL,  --Need M
    freqBand                         CSI-FrequencyOccupation         OPTIONAL,  -- Need M
    periodicityAndOffset             CSI-ResourcePeriodicityAndOffset OPTIONAL,  -- CondPeriodicOrSemiPersistent
    ...
}
-- TAG-CSI-IM-RESOURCE-STOP
-- ASN1STOP
```

Each field included in the parameter may be defined as follows.

TABLE 20

CSI-IM-Resource field descriptions csi-IM-ResourceElementPattern
The resource element pattern (Pattern0 (2.2) or Pattern1 (4.1)) with corresponding parameters (see TS 38.214 [19], clause 5.2.2.4)
freqBand
Frequency-occupancy of CSI-IM (see TS 38.214 [19], clause 5.2.2.4)
periodicityAndOffset
Periodicity and slot offset for periodic/semi-persistent CSI-IM. Network alwasy configures the UE with a value for this field for periodic and semi-persistent CSI-IM-Resources (as indicated in CSI-ResourceConfig).

TABLE 20-continued

CSI-IM-Resource field descriptions

A change of configuration between periodic or semi-persistent and aperiodic for a CSI-IM-Resource is not supported without a release and add.
subcarrierLocation-p0
OFDM subcarrier occupancy of the CSI-IM resource for Pattern0 (see TS 38.214 [19], clause 5.2.2.4)
subcarrierLocation-p1
OFDM subcarrier occupancy of the CSI-IM resource for pattern1 (see TS 38.214 [19], clause 5.2.2.4)

TABLE 20-continued

CSI-IM-Resource field descriptions symbolLocation-p0
OFDM symbol location of the CSI-IM resource for Pattern0
(see TS 38.214 [19], clause 5.2.2.4)
symbolLocation-p1
OFDM symbol location of the CSI-IM resource for Pattern1
(see TS 38.214 [19], clause 5.2.2.4)

In the parameter, conditional presence may be defined as follows.

TABLE 21

| Conditional Presence | Explanation |
|---|---|
| PeriodicOrSemiPersistent | The field is optionally present, Need M, for periodic and semi-persistent CSI-IM-Resources (as indicated in CSI-ResourceConfig). The field is absent otherwise. |

A higher layer parameter CSI-RS-ResourceConfigMobility applicable to the present disclosure may be configured as follows.

TABLE 22

CSI-RS-ResourceConfigMobility element

```
-- ASN1START
-- TAG-CSI-RS-RESOURCECONFIGMOBILITY-START
CSI-RS-ResourceConfigMobility :=      SEQUENCE {
    subcarrierSpacing                     SubcarrierSpacing,
    csi-RS-CellList-Mobility              SEQUENCE (SIZE (1..maxNro(CSI-RS-CellsRPM)) OF CSI-RS-CellMobility,
    ...,
}
CSI-RS-CellMobility ::=               SEQUENCE {
    cellId                                PhysCellId,
    csi-rs-MeasurementBW                  SEQUENTCE {
        nrofPRBs                              ENUMERATED ( size24, size48, size96, size192, size264 ),
        startPRB                              INTEGER(0..2169)
    },
    density                               ENUMERATED {d1,d3}                  OPTIONAL,  -- Need R
    csi-rs-ResourceList-Mobility          SEQUENCE (SIZE (1..maxNrofCSI-RS-ResourceRRM)) OF CSI-RS-Resource-Mobility
}
CSI-RS-Resource-Mobility ::=          SEQUENCE {
    csi-RS-Index                          CSI-RS-Index
    slotConfig                            CHOICE {
        ms4                                   INTEGER (0..31),
        ms5                                   INTEGER (0..39),
        ms10                                  INTEGER (0..79),
        ms20                                  INTEGER (0..159),
        ms40                                  INTEGER (0..319)
    },
    associatedSSB                         SEQUENCE {
        ssb-Index                             SSB-Index,
        isQuasiColocated                      BOOLEAN
    }                                                                         OPTIONAL, -- Need R
    frequencyDomainAllocation             CHOICE {
        row1                                  BIT STRING (SIZE (4)),
        row2                                  BIT STRING (SIZE (12))
},
```

TABLE 23

```
    firstOFDMSymbolInTimeDomain       INTEGER (0..13),
    sequenceGenerationConfig          INTEGER (0..1023),
    ...
}
CSI-RS-Index ::=                      INTEGER (0..maxNrofCSI-RS-ResourceRRM-1)
-- TAG_CSI-RS-RESOURCECINFIGMOBILITY-STOP
-- ASN1STOP
```

Each field included in the parameter may be defined as follows.

TABLE 24

CSI-RS-CellMobility field descriptions csi-rs-ResourceList-Mobility
List of CSI-RS resources for mobility. The maximum number of CSI-RS resources that can be configured per measObjectNR depends on the configuration of associatedSSB and the support of

TABLE 24-continued

CSI-RS-CellMobility field descriptions increasedNumberofCSIRSPerMO capability (see TS 38.214 [19], clause 5.1.6.1.3).
density
Frequency domain density for the 1-port CSI-RS for L3 mobility. See TS 38.211 [16], clause 7.4.1.

TABLE 24-continued

CSI-RS-CellMobility field descriptions nrofPRBs
Allowed size of measurement BW in PRBs.
See TS 38.211 [16], clause 7.4.1.
startPRB
Starting PRB index of the measurement bandwidth. See TS 38.211 [16], clause 7.4.1.

TABLE 25

CSI-RS-ResourceConfigMobility field descriptions csi-RS-CellList-Mobility
List of cells for CSI-RS based RRM measurements.
refServCellIndex
Indicates the serving cell providing the timing reference for CSI-RS resources without associatedSSB. The field may be present only if there is at least one CSI-RS resource configured without associatedSSB. If this field is absent, the UE shall use the timing of the PCell for measurements on the CSI-RS resources without associatedSSB. The CSI-RS resources and the serving cell indicated by refServCellIndex for timing reference should be located in the same band.
subcarrierSpacing
Subcarrier spacing of CSI-RS. Only the values 15, 30 kHz or 60 kHz (FR1), and 60 or 120 kHz (FR2) are applicable.

TABLE 26

CSI-RS-Resource-Mobility field descriptions associatedSSB
If this field is present, the UE may base the timing of the CSI-RS resource
indicated in CSI-RS-Resource-Mobility on the timing of the cell indicated
by the cellId in the CSI-RS-CellMobility. In this case, the UE is not required
to monitor that CSI-RS resource if the UE cannot detect the SS/PBCH block
indicated by this associatedSSB and CellId. If this field is absent, the UE
shall base the timing of the CSI-RS resource indicated in CSI-RS-Resource-Mobility
on the timing of the serving cell indicated by refServCellIndex. In this case, the UE is
required to measure the CSI-RS resource even if SS/PBCH block(s) with cellId in the
CSI-RS-CellMobility are not detected. CSI-RS resources with and without associatedSSB
may be configured in accordance with the rules in TS 38.214 [19], clause 5.1.6.1.3.
csi-RS-Index
CSI-RS resource index associated to the CSI-RS resource to be measured (and used
for reporting).
firstOFDMSymbolInTimeDomain
Time domain allocation within a physical resource block. The field indicates the first
OFDM symbol in the PRB used for CSI-RS, see TS 38.211 [16], clause 7.4.1.5.3.
Value 2 is supported only when dmrs-TypeA-Position equals pos3.
frequencyDomainAllocation
Frequency domain allocation within a physcial resource block in accordance with
TS 38.211 [16], clause 7.4.1.5.3 including table 7.4.1.5.2-1. The number of bits that
may be set to one depend on the chosen row in that table.
isQuasiColocated
Indicates that the CSI-RS resource is quasi co-located with the associated SS/PBCH
block, see TS 38.214 [19], clause 5.1.6.1.3.
sequenceGenerationConfig
Scrambling ID for CSI-RS (see TS 38.211 [16], clause 7.4.1.5.2).
slotConfig
Indicates the CSI-RS periodicity (in miliseconds) and for each periodicity the offset
(in number of slots). When subcarrierSpacingCSI-RS is set to kHz15, the maximum
offset values for periodicities ms4/ms5/ms10/ms20/ms40 are 3/4/9/19/39 slots. When
subcarrierSpacingCSI-RS is set to kHz30, the maximum offset values for periodicities
ms4/ms5/ms10/ms20/ms40 are 7/9/19/39/79 slots. When subcarrierSpacingCSI-RS
is set to kHz60, the maximum offset values for periodicities ms4/ms5/ms10/ms20/ms40
are 15/19/39/79/159 slots. When subcarrierSpacingCSI-RS is set kHz120, the maximum
offset values for periodicities ms4/ms5/ms10/ms20/ms40 are 31/39/79/159/319 slots.

A higher layer parameter CSI-ReportConfig applicable to the present disclosure may be configured as follows.

TABLE 27

CSI-ReportConfig information element

```
-- ASN1START
-- TAG-CSI-REPORTCONFIG-START
CSI-ReportConfig ::=            SEQUENCE {
    reportConfigId                  CSI-ReportConfigId,
    carrier                         ServCellIndex                               OPTIONAL,   -- Need S
    resourcesForChannelMeasurement      CSI-ResourceConfigId,
    csi-IM-ResourcesForInterference     CSI-ResourceConfigId                    OPTIONAL,   -- Need R
    nzp-CSI-RS-ResourcesForInterference CSI-ResourceConfigId                    OPTIONAL,   -- Need R
    reportConfigType                CHOICE {
        periodic                        SEQUENCE {
            reportSlotConfig                CSI-ReportPeriodicityAndOffset,
            pucch-CSI-ResourceList              SEQUENCE (SIZE(1..maxNrofBWPs)) OFPUCCH-CSI-Resource
        },
        semiPersistentOnPUCCH           SEQUENCE {
            reportSlotConfig                CSI-ReportPeriodicityAndOffset,
            pucch-CSI-ResourceList              SEQUENCE (SIZE(1..maxNrofBWPs)) OFPUCCH-CSI-Resource
        },
        semiPersistentOnPUSCH           SEQUENCE {
            reportSlotConfig                ENUMERATED {sl5, sl10,sl20, sl40, sl80, sl160,sl320},
            reportSlotOffsetList        SEQUENCE (SIZE (1..maxNrofUL-Allocations)) OFINTEGER(0..32),
            p0alpha                         P0-PUSCH-AlphaSetId
        },
        aperiodic                       SEQUENCE {
            reportSlotOffsetList            SEQUENCE (SIZE(1..maxNrofUL-Allocations)) OFINTEGER(0..32)
        }
    },
```

TABLE 28

```
reportQuantity              CHOICE {
    none                            NULL,
    cri-RI-PMI-CQI                  NULL,
    cri-RI-i1               NULL,
    cri-RI-i1-CQI           SEQUENCE {
        pdsch-BundleSizeForCSI              ENUMERATED {n2, n4}         OPTIONAL -- Need S
    },
    cri-RI-CQI              NULL,
    cri-RSRP                        NULL,
    ssb-Index-RSRP                  NULL,
    cri-RI-LI-PMI-CQI           NULL
},
```

TABLE 29

```
reportFreqConfiguration     SEQUENCE {
    cqi-FormatIndicator             ENUMERATED { widebandCQI, subbandCQI }       OPTIONAL,   -- Need R
    pmi-FormatIndicator             ENUMERATED { widebandPMI, subbandPMI }       OPTIONAL,   -- Need R
    csi-ReportingBand               CHOICE {
        subbands3                       BIT STRING(SIZE(3)),
        subbands4                       BIT STRING(SIZE(4)),
        subbands5                       BIT STRING(SIZE(5)),
        subbands6                       BIT STRING(SIZE(6)),
        subbands7                       BIT STRING(SIZE(7)),
        subbands8                       BIT STRING(SIZE(8)),
        subbands9                       BIT STRING(SIZE(9)),
        subbands10                      BIT STRING(SIZE(10)),
        subbands11                      BIT STRING(SIZE(11)),
        subbands12                      BIT STRING(SIZE(12)),
        subbands13                      BIT STRING(SIZE(13)),
        subbands14                      BIT STRING(SIZE(14)),
        subbands15                      BIT STRING(SIZE(15)),
```

TABLE 29-continued

```
            subbands16              BIT STRING(SIZE(16)),
            subbands17              BIT STRING(SIZE(17)),
            subbands18              BIT STRING(SIZE(18)),
            ...,
            subbands19-v1530        BIT STRING(SIZE(19))
        } OPTIONAL  -- Need S
    }                                                                            OPTIONAL,  -- Need R
    timeRestrictionForChannelMeasurements        ENUMERATED {configured, notConfigured},
    timeRestrictionForInterferenceMeasurements   ENUMERATED {configured, notConfigured}
    codebookConfig                  CodebookConfig                               OPTIONAL,  -- Need R
    dummy                           ENUMERATED {n1, n2}                          OPTIONAL,  -- Need R
    groupBasedBeamReporting         CHOICE {
        enabled                     NULL,
        disabled                    SEQUENCE {
            nrofReportedRS          ENUMERATED {n1, n2, n3, n4}                  OPTIONAL  -- Need S
        }
    },
    cqi-Table            ENUMERATED {table1, table2, table3, spare1}             OPTIONAL,  -- Need R
    subbandSize          ENUMERATED {value1, value2},
    non-PMI-PortIndication   SEQUENCE (SIZE (1 maxNrofNZP-CSI-RS-ResourcesPerConfig)) OF PortIndexFor8Ranks OPTIONAL,  -- Need R
    ...,
    [[
    semiPersistentOnPUSCH-v1530     SEQUENCE {
        reportSlotConfig-v1530      ENUMERATED {sl4, sl8, sl16}
    }                                                                            OPTIONAL,  -- Need R
```

In Table 28, reportQuantity denotes CSI-related quantity to be reported by the UE.

Each field included in the parameter may be defined as shown in the following tables.

TABLE 30

| CSI-ReportConfig field descriptions |
|---|
| carrier |
| Indicates in which serving cell the CSI-ResourceConfig indicated below are to be found. If the field is absent, the resources are on the same serving cell as this report configuration. |
| codebookConfig |
| Codebook configuration for Type-1 or Type-2 including codebook subset restriction. Network does not configure codebookConfig and codebookConfig-r16 simultaneously to a UE |
| cqi-FormatIndicator |
| Indicates whether the UE shall report a single (wideband) or multiple (subband) CQI (see TS 38.214 [19], clause 5.2.1.4). |
| cqi-Table |
| Which CQI table to use for CQI calculation (see TS 38.214 [19], clause 5.2.2.1). |
| csi-IM-ResourcesForInterference |
| CSI-IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. |
| csi-ReportingBand |
| Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise (see TS 38.214 [19], clause 5.2.1.4). |
| dummy |
| This field is not used in the specification. If received it shall be ignored by the UE. |
| groupBasedBeamReporting |
| Turning on/off group beam based reporting (see TS 38.214 [19], clause 5.2.1.4). |
| non-PMI-PortIndication |
| Port indication for RI/CQI calculation. For each CSI-RS resource in the linked ResourceConfig for channel measurement, a port indication for each rank R, indicating which R ports to use. Applicable only for non-PMI feedback (see TS 38.214 [19], clause 5.2.1.4.2). The first entry in non-PMI-PortIndication corresponds to the NZP-CSI-RS-Resource indicated by the first entry in nzp-CSI-RS-Resources in the NZP-CSI-RS-ResourceSet indicated in the first entry of nzp-CSI-RS-ResourcesetList of the CSI-ResourceConfig whose CSI-ResourceConfigId is indicated in a CSI-MeasId together with the above CSI-ReportConfigId, the second entry in non-PMI-PortIndication corresponds to the NZP-CSI-RS-Resource indicated by the second entry in nzp-CSI-RS-Resources in the NZP-CSI-RS-ResourceSet indicated in the first entry of nzp-CSI-RS-ResourceSetList of the same CSI-ResourceConfig, and so on until the |

TABLE 30-continued

CSI-ReportConfig field descriptions

NZP-CSI-RS-Resource indicated by the last entry in nzp-CSI-RS-Resources in the
in the NZP-CSI-RS-ResourceSet indicated in the first entry of nzp-CSI-RS-ResourceSetList
of the same CSI-ResourceConfig. Then the next entry corresponds to the
NZP-CSI-RS-Resource indicated by the first entry in nzp-CSI-RS-ResourceSet indicated in
the second entry of nzp-CSI-RS-ResourceSetList of the same CSI-ResourceConfig and so on.
nrofReportedRS
The number (N) of measured RS resources to be reported per report setting in a non-group-
based report. N <= N max, where N max is either 2 or 4 depending on UE capability.
(see TS 38.214 [19], clause 5.2.1.4) When the field is absent the UE applies the value 1.
nzp-CSI-RS-ResourcesForInterference
NZP CSI RS resources for interference measurement csi-ResourceConfigId of a
CSI-ResourceConfig included in the configuration of the serving cell indicated with the
field "carrier" above. The CSI-ResourceConfig indicated here contains only
NZP-CSI-RS resources. The bwp-Id in that CSI-ResourceConfig is the same value as the
bwp-Id in the CSI-ResourceConfig indicated by resourcesForChannelMeasurement.

TABLE 31 p0alpha
Index of the p0-alpha set determining the power control for this CSI report
transmission (see TS 38.214 [19], clause 6.2.1.2).
pdsch-BundleSizeForCSI
PRB bundling size to assume for CQI calculation when reportQuantity is CRt/
RI/t1/CQI. If the field is absent, the UE assumes that no PRB bundling is
applied (see TS 38.214 [19], clause 5.2.1.4.2)
pmi-FormatIndicator
Indicates whether the UE shall report a single (wideband) or multiple
(subband) PMI. (see TS 38.214 [19], clause 5.2.1.4).
pucch-CSI-ResourceList
Indicates which PUCCH resource to use for reporting PUCCH.
reportConfigType
Time domain behavior of reporting configuration.
reportFreqConfiguration
Reporting configuration in the frequency domain. (see TS 38.214 [19],
clause 5.2.1.4).
reportQuantity
The CSI related quantities to report. see TS 38.214 [19], clause 5.2.1. If the
field reportQuantity-r16 is present, UE shall ignore reportQuantity (without
suffix).
reportSlotConfig
Periodicity and slot offset (see TS 38.214 [19], clause 5.2.1.4). If the field
reportSlotConfig-v1530 is present, the UE shall ignore the value provided in
reportSlotConfig (without suffix).
reportSlotOffsetList, reportSlotOffsetListDCI-0-1, reportSlotOffsetListDCI-0-2
Timing offset Y for semi persistent reporting using PUSCH. This field
lists the allowed offset values. The list must have the same number of entries
as the pusch-TimeDomainAllocationList in PUSCH-Config. A particular
value is indicated in DCI. The network indicates in the DCI field of the UL
grant, which of the configured report slot offsets the UE shall apply. The DCI
value 0 corresponds to the first report slot offset in this list, the DCI value 1
corresponds to the second report slot offset in this list, and so on. The first
report is transmitted in slot n + Y, second report in n + Y + P, where P is
the configured periodicity.
Timing offset Y for aperiodic reporting using PUSCH. This field lists the allowed
offset values. This list must have the same number of entries as the pusch-
TimeDomainAllocationList in PUSCH-Config. A particular value is indicated
in DCI. The network indicates in the DCI field of the UL grant, which of the
configured report slot offsets the UE shall apply. The DCI value 0 corresponds
to the first report slot offset in this list, the DCI value 1 corresponds to the second
report slot offfset in this list, and so on (see TS 38.214 [19], clause 6.1.2.1).
The field reportSlotOffsetListDCI-0-1 applies to DCI format 0_1 and the field
reportSlotOffsetListDCI-0-2 applies to DCI format 0_2 (see TS 38.214 [19],
clause 6.1.2.1).
resourcesForChannelMeasurement
Resources for channel measurement. csi-ResourceConfigId of a
CSI-Resource-Config included in the configuration of the serving cell indicated
with the field "carrier" above.
The CSI-ResourceConfig indicated here contains only NZP-CSI-RS resources
and/or SSB resources. This CSI-ReportConfig is associated with the DL BWP
indicated by bwp-Id in that CSI-ResourceConfig.
subbandSize
Indicates one out of two possible BWP-dependent values for the subband
size as indicated in TS 38.214 [19], table 5.2.1.4-2. If csi-ReportingBand is
absent, the UE shall ignore this field.

TABLE 31-continued timeRestrictionForChannelMeasurements
Time domain measurement restriction for the channel (signal) measurements
(see TS 38.214 [19], clause 5.2.1.1).
timeRestrictionForInterferenceMeasurements
Time domain measurement restriction for intereference measurements
(see TS 38.214 [19], clause 5.2.1.1).

1.9. Asynchronous Multiple Cells

FIG. 11 is a diagram schematically illustrating radio frame structures of two cells (BSs, carriers, etc.) applicable to the present disclosure.

In FIG. 11, a region represented by #n refers to an n-th slot (or subframe).

As shown in FIG. 11, cell #0 and cell #1 may have different radio frame boundaries. In other words, the radio frame boundary of cell #0 may not be aligned with that of cell #1. These two cells may be regarded as asynchronous cells in terms of time.

Thus, when a UE is allocated slot #2, the transmission and reception time of the UE may depend on which cell the UE is associated with.

Accordingly, a CSI-RS resource timing configured for neighboring cell measurement may need to be synchronized with the timing of a cell in which a CSI-RS resource is transmitted rather than the timing of a serving cell.

In the present disclosure, when it is said the timings of two cells are asynchronous, it may mean that the time difference between the two cells is at least one OFDM symbol unit (for example, the time synchronization difference between the two cells is one OFDM symbol) or at least one sample unit.

1.10. White/Blacklisted Cell

In the present disclosure, a whitelisted cell may refer to a neighboring cell that the UE needs to measure.

For example, the BS may inform the UE of the identifier of a neighboring cell which corresponds to a measurement target (in the form of a whitelisted cell). In addition, even when the neighboring cell that the UE needs to measure is not specified, the UE may measure cells on a frequency corresponding to the measurement target.

In the present disclosure, a blacklisted cell may refer to a cell that the UE should not measure or a cell that the UE should not report even though the UE performs measurement therefor.

For example, the network may instruct the UE not to perform event evaluation for a specific cell or not to send a measurement report. By doing so, the network may prevent the UE from being handed over to the specific cell.

When the specific cell has a lot of loads, the blacklisted cell may be used to prevent the UE, which is currently served by another cell, from being handed over to the specific cell.

2. Proposed Embodiments

Hereinafter, the configurations according to the present disclosure will be described in detail based on the above-described technical features.

Figure 12:
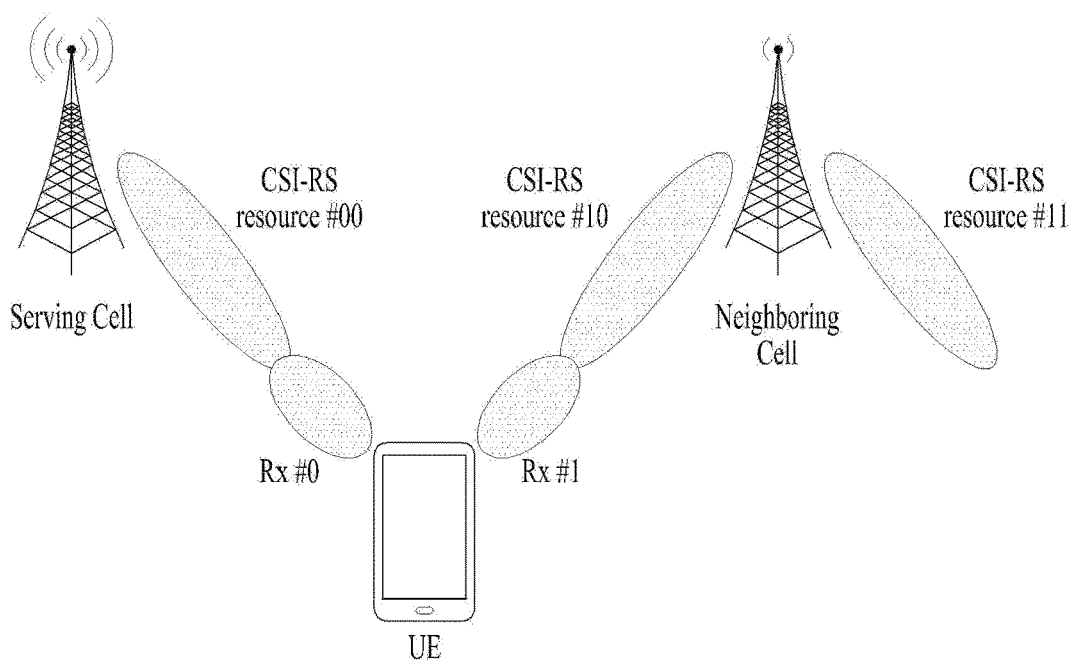
FIG. 12 is a diagram schematically illustrating a relationship between a user equipment (UE) and base stations (BSs) applicable to the present disclosure.

FIG. 12 is a diagram schematically illustrating a relationship between a UE and BSs applicable to the present disclosure.

Referring to FIG. 12, when the UE is capable of reporting reference signal received power (RSRP) of CSI-RS resources #10 and #11 to the BS, the BS or network may operate as follows.

For example, if a serving cell (or a serving transmission reception point (TRP)) provides services to the UE, a neighboring cell may transmit no signals on the resource (or beam) in the direction of CSI-RS resource #10, thereby reducing inter-cell interference.

As another example, when the UE is provided with services on the resources (or beams) in the directions of both CSI-RS resource #00 of the serving cell and CSI-RS resource #10 of the neighboring cell (that is, when the UE is in a coordinated multi-point (CoMP) environment), the BS or network may improve the reception performance of the UE.

Consequently, when the UE is capable of measuring and reporting a CSI-RS transmitted from the neighboring cell, the overall system throughput may be improved in terms of inter-cell interference management and/or CoMP operation.

It is assumed herein that serving and neighboring cells are asynchronous for convenience of description. However, the configurations of the present disclosure may be equally applied when the serving and neighboring cells are synchronized. In this case, the UE may determine the timing of a CSI-RS (e.g., CSI-RS resource #10 or #11) of the neighboring cell with respect to the timing of the neighboring cell and perform CSI reporting based thereon.

However, according to the current NR specifications, the timing of the higher layer parameter NZP-CSI-RS-resource is configured to follow the timing of the serving cell. In other words, a method of setting the timing of the higher layer parameter NZP-CSI-RS-Resource with respect to the timing of a neighboring cell is not defined in the current NR specifications. As a result, there is no choice but to determine the timings of CSI-RS resources with respect to a serving cell in the current NR technology.

Regarding a CSI-RS for mobility (or CSI-RS-Resource-Mobility) defined in the recently discussed 5G specifications, the BS or network may instruct the UE to configure the timing of CSI-RS-Resource-Mobility with respect to the timing of another cell rather than the serving cell based on a cell ID configured in CSI-RS-CellMobility.

However, since the CSI-RS for mobility has no connection with the aforementioned CSI-ReportConfig IE (that is, since a connection between the CSI-RS for mobility and the aforementioned CSI-ReportConfig IE is not defined), the UE may measure and report the CSI-RS for mobility (e.g., L3 reporting). Here, reporting based on the CSI-RS for mobility includes only L3 reporting and does not include L1 reporting.

According to the current specifications, CSI-RS-Resource-Mobility may not be used for L1 beam measurement (i.e., L1 measurement and/or L1 reporting) due to the two issues.

Accordingly, the present disclosure proposes a method for solving such problems. Specifically, the present disclosure describes a signaling method capable of using CSI-RS-Resource-Mobility for L1 beam measurement (or L1 measurement). According to the present disclosure, the BS or network may configure a CSI-RS resource for beam management of a neighboring cell for the UE with the minimum impact on the recently discussed 5G specifications.

In the present disclosure, CSI-RS resource Type I denotes a CSI-RS resource defined in a CSI framework. For example, CSI-RS resource Type I may include a CSI-RS for (beam) measurement, CSI acquisition, and/or tracking. Alternatively, CSI-RS resource Type I may include a CSI-RS determined based on the higher layer parameter NZP-CSI-RS-Resource IE or CSI-IM resource IE described above.

In the present disclosure, CSI-RS resource Type II denotes a CSI-RS resource for mobility. Alternatively, CSI-RS resource Type II may include a CSI-RS determined based on the higher layer parameter CSI-RS-resource-Mobility IE described above.

In the present disclosure, a higher layer parameter may refer to a parameter defined by radio resource control (RRC), a medium access control-control element (MAC-CE), and/or a combination thereof.

In the present disclosure, a synchronization signal block (SSB) ID refers to an SSB (time) index or an SSB (time) identification.

Herein, a network may include a BS. In some embodiments, the network may be replaced with the BS.

2.1. First Proposal

The network may configure a CSI-RS resource ID for mobility (CSI-RS-Resource-Mobility or csi-RS-Index of CSI-RS-Resource-Mobility) as a QCL source for CSI-RS resource Type I (NZP-CSI-RS-Resource or CSI-IM-resource) and at least one QCL type.

The UE may configure the time synchronization (e.g., average delay or timing), frequency synchronization (Doppler shift or carrier frequency offset (CFO)), and/or spatial Rx information of CSI-RS resource Type I based on the time synchronization (e.g., average delay or timing), frequency synchronization (Doppler shift or CFO), and/or spatial Rx information of a CSI-RS resource for mobility, respectively.

Specifically, the network may configure the CSI-RS resource ID for mobility (CSI-RS-Resource-Mobility or csi-RS-Index in CSI-RS-Resource-Mobility) as a QCL source of a CSI-RS resource for (beam) measurement (NZP-CSI-RS-Resource or CSI-IM-Resource). In this case, the QCL type may be set to QCL-Type A, QCL-Type B, QCL-Type C, and/or QCL-Type D.

In this configuration, assuming that the network sets the QCL type to QCL-Type C+D, the UE may operate as follows.

The configuration of QCL-Type C+D may mean that two RSs are QCL in terms of the average delay (time synchronization and/or timing), Doppler shift (CFO or frequency synchronization), and/spatial Rx parameter (Rx beam). Thus, to receive a CSI-RS for (beam) measurement, the UE may use the time/frequency synchronization and Rx beam information provided by CSI-RS-Resource-Mobility.

In this case, if associatedSSB of CSI-RS-Resource-Mobility is configured, the UE may expect that QCL-Type C will be configured (or assume that the QCL-Type C has been configured). The reason for this is that the timing of CSI-RS-Resource-Mobility needs to follow the timing of a cell with a cell ID provided by CSI-RS-CellMobility. In this case, the UE may obtain the time and frequency synchronization of the cell from associatedSSB regardless of the timing. In some embodiments, the time synchronization may mean only the average delay. Alternatively, the time synchronization may refer to a configuration including not only the average delay but the timing.

Alternatively, QCL-type C may be configured independently in the above configuration. For example, when QCL-Type D (e.g., spatial Rx parameter) is not applicable, QCL-type D may not be configured.

Assuming that the network sets the QCL type to only QCL-Type D unlike the above assumption, the UE may operate as follows.

Based on the fact that two RSs are QCL in terms of the spatial Rx parameter, the UE may use Rx beam information provided by CSI-RS-Resource-Mobility when receiving a CSI-RS for (beam) measurement.

In the above configuration, when determining the timing of NZP-CSI-RS-Resource including CSI-RS-Resource-Mobility as a QCL source, the UE may determine the timing of NZP-CSI-RS-Resource with respect to the timing of a serving cell (or PCell)

Alternatively, when CSI-RS-Resource-Mobility is configured without the higher layer parameter associatedSSB and a higher layer parameter refServCellIndex is not configured in CSI-RS-ResourceConfigMobility, the UE may determine the timing of NZP-CSI-RS-Resource with respect to the timing of the serving cell, regardless of whether QCL-Type C is configured or not.

In this case, if associatedSSB of CSI-RS-Resource-Mobility is not configured, the UE may expect that QCL-type C will not be configured. The reason for this is that when associatedSSB is not configured, the UE is incapable of configuring time/frequency synchronization based on an SSB.

Alternatively, when QCL-Type D is not applicable in the above configuration, no QCL types may be configured.

To support the above-described operations, the network may configure for the UE csi-RS-Index of CSI-RS-Resource-Mobility as a QCL source of NZP-CSI-RS-Resource. In this case, csi-RS-Index may have a value from 0 to 95.

In the present disclosure, NZP-CSI-RS-ResourceId may have a value from 0 to 191.

According to the current NR specifications, NZP-CSI-RS-Resource may be set to the QCL source of NZP-CSI-RS-Resource, but there is a restriction that csi-RS-Index is not configured. Thus, the present disclosure proposes a method of setting csi-RS-Index to a QCL source using CSI-RS-Resource-Mobility.

When not only NZP-CSI-RS-Resource but csi-RS-Index are set to the QCL source of NZP-CSI-RS-Resource as proposed by the present disclosure, the UE may be incapable of distinguishing whether the QCL source with a value from 0 to 95 is for NZP-CSI-RS-Resource or CSI-RS-Resource-Mobility.

To solve such a problem, the present disclosure proposes to include a higher layer parameter csi-rs-mobility for CSI-RS-Resource-Mobility in the higher layer parameter QCL-Info as follows. By doing so, the ambiguity between NZP-CSI-RS-Resource and CSI-RS-Resource-Mobility may be resolved.

TABLE 32

```
QCL-Info :: = SEQUENCE {
    cell                servCellIndex,
    bwp-Id              BWP-Id OPTIONAL
    referenceSignal     CHOICE {
        csi-rs              NZP-CSI-RS-ResourceId,
        ssb                 SSB-Index
        csi-rs-mobility     csi-RS-Index
    },
    qcl-Type ENUMERATED {typeA, typeB, typeC, typeD},
}
```

As described above, some parameters in the NZP-CSI-RS-Resource IE may overlap with those in the CSI-RS-Resource-Mobility IE (see Tables 12 and 22).

Thus, the UE operation may need to be clarified regarding the overlapping parameters.

According to the present disclosure, since CSI-RS-Resource-Mobility is used as the QCL source, the UE may (preferentially) obtain the time/frequency location, period, and/or scrambling ID for an RS from IEs included in NZP-CSI-RS-Resource (e.g., resourceMapping, periodicAndOffset, scramblingID, etc.). Alternatively, the UE may (preferentially) obtain the time/frequency location, period, and/or scrambling ID for an RS from IE(s) included in CSI-RS-Resource-Mobility.

Alternatively, the UE according to the present disclosure may expect that periodicAndOffset and scramblingID are always equal to slotConfig and sequenceGenerationConfig, respectively.

The higher layer parameter CSI-RS-Resource-Mobility includes no frequency information (e.g., BW information, frequency density, etc.). However, since the parameter is included in a higher IE, CSI-RS-CellMobility, the UE may obtain frequency information for CSI-RS-Resource-Mobility, which is used as the QCL source, from CSI-RS-CellMobility.

The UE may obtain information about the subcarrier spacing (or numerology) of NZP-CSI-RS-Resource having CSI-RS-Resource-Mobility as the QCL source from subcarrierSpacing in a higher layer parameter CSI-RS-ResourceConfigMobility IE (which is a higher IE than CSI-RS-CellMobility).

According to the method, even when the serving and neighboring cells have different time/frequency synchronization, the network may simply resolve such a synchronization problem by setting the CSI-RS resource ID for mobility to the QCL source of CSI-RS resource Type I, and at the same time, the network may use the conventional (L1) CSI reporting method as it is. When the serving and neighboring cells have different numerologies, the network may provide/configure information about a subcarrier spacing to/for the UE through the CSI-RS-ResourceConfigMobility IE.

In summary, the network and UE may use a CSI-RS from the neighboring cell for (L1 beam) measurement while minimizing the impact on the current 5G NR specifications.

When CSI-RS resource Type I is QCL with the CSI-RS resource for mobility (or when CSI-RS-Resource-Mobility is set to the QCL source of NZP-CSI-RS-Resource), the UE may know which cell transmits CSI-RS resource Type I since the higher IE CSI-RS-CellMobility including the higher layer parameter CSI-RS-Resource-Mobility contains cell ID information.

Figure 13:
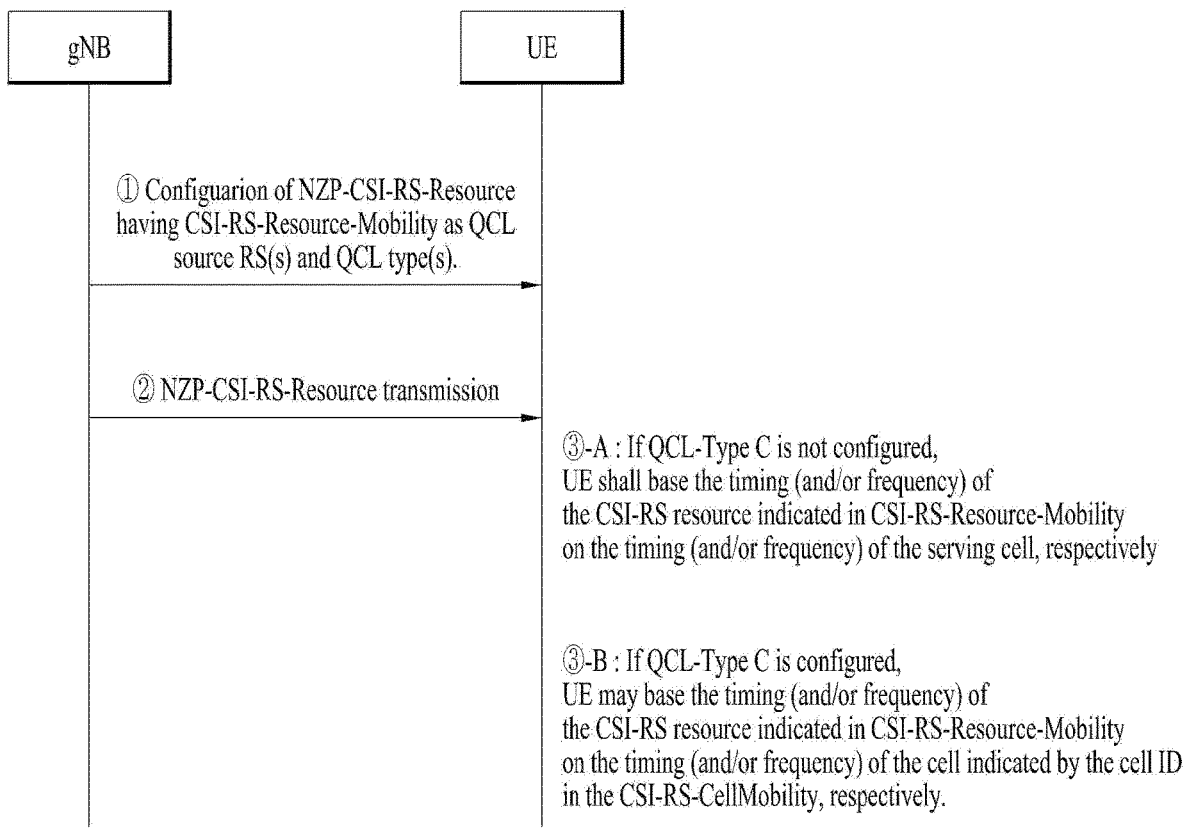
FIG. 13 is a diagram schematically illustrating the operations of a UE and a BS applicable to the present disclosure.

FIG. 13 is a diagram schematically illustrating the operations of a UE and a BS applicable to the present disclosure.

As shown in FIG. 13, the BS may configure CSI-RS-Resource-Mobility as the QCL source of NZP-CSI-RS-Resource for the UE. In this case, the BS may configure QCL-Type A, QCL-Type B, QCL-Type C, and/or QCL-Type D as QCL type information or may not configure any QCL types.

Next, the BS transmits a CSI-RS corresponding to NZP-CSI-RS-Resource (or CSI-RS-Resource-Mobility) to the UE.

In this case, if the BS does not configure QCL-Type C, the UE may receive the CSI-RS by configuring the time and/or frequency synchronization of NZP-CSI-RS-Resource with respect to a serving cell. In other words, the UE may receive the CSI-RS from the BS based on the time and/or frequency synchronization of the serving cell.

If the BS configures QCL-Type C, the UE may receive the CSI-RS by configuring the time and/or frequency synchronization of NZP-CSI-RS-Resource with respect to a cell with a cell ID indicated by CSI-RS-CellMobility. Alternatively, the UE may receive the CSI-RS by configuring the time and/or frequency synchronization with respect to associatedSSB of CSI-RS-Resource-Mobility. In other words, the UE may receive the CSI-RS from the BS based on the time and/or frequency synchronization of a cell indicated by associatedSSB of CSI-RS-Resource-Mobility or CSI-RS-Resource-Mobility.

2.2. Second Method

A BS may inform a UE that CSI-RS resource Type I is to be transmitted from a neighboring cell rather than a serving cell through higher layer signaling (e.g., higher layer parameter) and/or DCI. In this case, the UE may interpret/consider the value of N_ID (e.g., ScramblingID) configured in a CSI-RS resource as a cell ID. In addition, the UE may interpret/consider an SSB ID configured in the CSI-RS resource as the SSB ID of a cell with the cell ID. Further, the UE may configure the timing of the CSI-RS resource based on the timing of the cell with the cell ID.

For example, the BS may inform the UE that a CSI-RS resource for (beam) measurement is to be transmitted from a cell that is not the serving cell through a higher layer parameter. The UE may interpret/consider N_ID and the SSB ID configured for the CSI-RS resource as the cell ID and the SSB ID of the cell with the cell ID, respectively, and determine the timing of the cell with respect to an indicated SSB.

According to this method, the BS may inform the UE that CSI-RS resource Type I configured for the UE is to be transmitted from the neighboring cell through a single higher layer parameter. Accordingly, since other preconfigured parameters may be reevaluated based on the signaling, the existing parameters may be used (without defining new parameters). That is, according to the proposed method, the impact on the current 5G specification may be minimized.

Further, according to this method, the BS may inform the UE CSI-RS resource type I of the neighboring cell without defining a CSI-RS resource for mobility.

Additionally, in the case of CSI-RS resource Type I, the BS may configure a higher layer parameter QuasiColocatedforType1 for the UE. The BS may inform the UE whether the CSI-RS resource is QCL with the configured SSB in terms of QCL-Type D through the parameter. In other words, the parameter may perform the same functionality as a higher layer parameter QuasiColocated in a CSI-RS for mobility.

2.3. Third Method

A BS may directly indicate a neighboring cell ID to a UE to instruct the UE to measure a CSI-RS resource transmitted in a cell with the cell ID. In this case, the UE may apply various Rx beams to receive the CSI-RS resource.

However, the UE may consume a large amount of resources to search for the best Rx beam for receiving the CSI-RS.

If the BS configures the cell ID with respect to whitelisted cells, the UE may know the Rx beam for receiving the cell and thus minimize the resource consumption.

Specifically, when the BS informs the UE that CSI-RS resource Type I is to be transmitted from a neighboring cell rather than a serving cell through a higher layer parameter or DCI, the UE may expect that the cell ID configured for the CSI-RS resource is included in the whitelisted cells. Alternatively, the UE may not expect that a cell ID not included in the whitelisted cells is configured for the CSI-RS resource.

2.4. Third Method

In FIG. 12, the RSRP of CSI-RS resource #00 may be different from that of CSI-RS resource #10 depending on the Rx beam of the UE (e.g., Rx #0 or #1). Thus, if the UE reports the RSRP of CSI-RS resource #00 with respect to Rx #0 and report the RSRP of CSI-RS resource #10 with respect to Rx #1, the following problems may occur.

For example, it is assumed that each of the RSRP reported by the UE based on Rx #0 and the RSRP reported by the UE based on Rx #1 have a large value (or is more than or equal to a predetermined threshold). In this case, the serving cell may provide services to the UE using a resources (or beam) based on CSI-RS resource #00, and the neighboring cell may not use the same time/frequency resource as the serving cell to avoid interference, that is, the neighboring cell may provide services to the UE in the neighboring cell using a resource (or beam) based on CSI-RS resource #10.

However, in this case, the UE may receive a signal by selecting Rx #0 and thus avoid most of signals (or interference) transmitted from the neighboring cell. That is, the interference avoidance performed by the neighboring cell may be unnecessary.

Consequently, the network may perform inefficient scheduling.

To solve such a problem, when a specific UE reports RSRP for two CSI-RS resources, the network may instruct the UE to report the RSRP with respect to the same Rx beam Specifically, when reporting of a CSI-RS resource indicator (CRI) and RSRP is configured to be performed based on the measurement of a plurality of CSI-RS resources included in different resource sets or settings, the network may instruct the UE to perform the measurement and reporting with respect to the same UE Rx beam (through a higher layer parameter and/or DCI).

In this case, if the number of CSI resources that can be reported by the UE is less than the total number of CSI-RS resources, the network may instruct the UE to report at least one CSI-RS resource for each resource set or setting (through a higher layer parameter and/or DCI).

Figure 14:
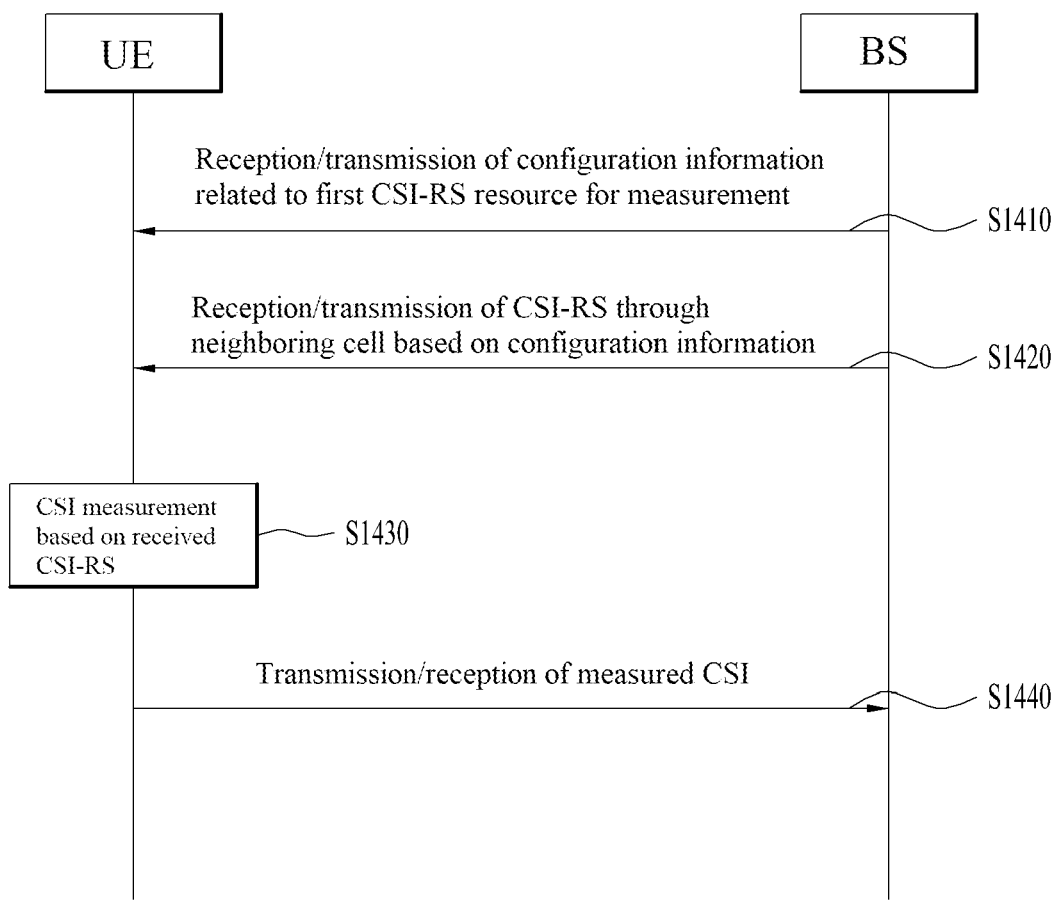
FIG. 14 is a diagram schematically illustrating a method of transmitting and receiving channel state information (CSI) between a UE and a BS according to the present disclosure.
Figure 15:
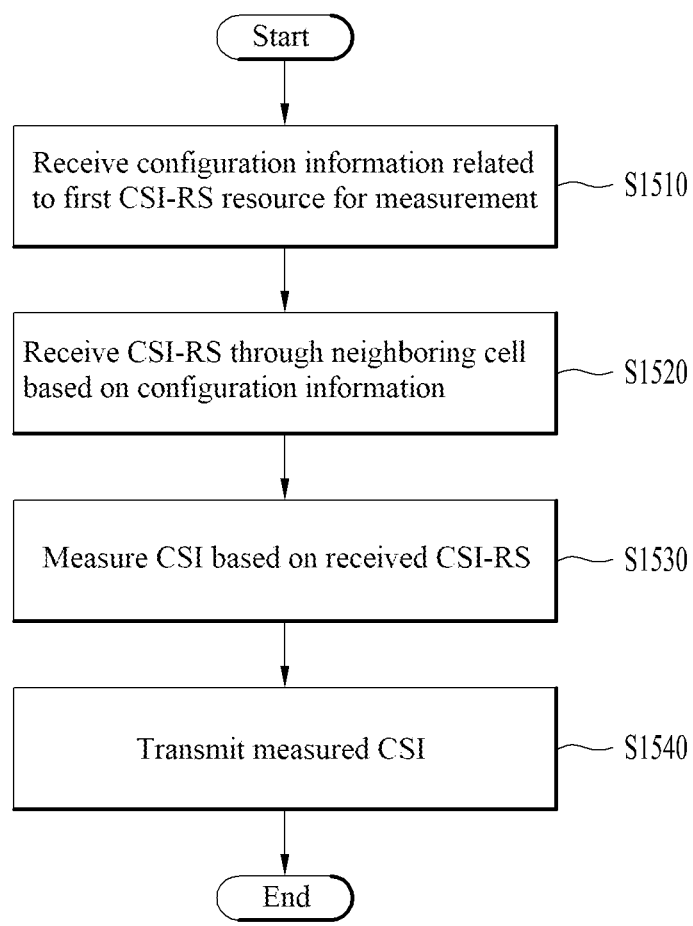
FIG. 15 is a flowchart illustrating a method for the UE to report the CSI according to the present disclosure.
Figure 16:
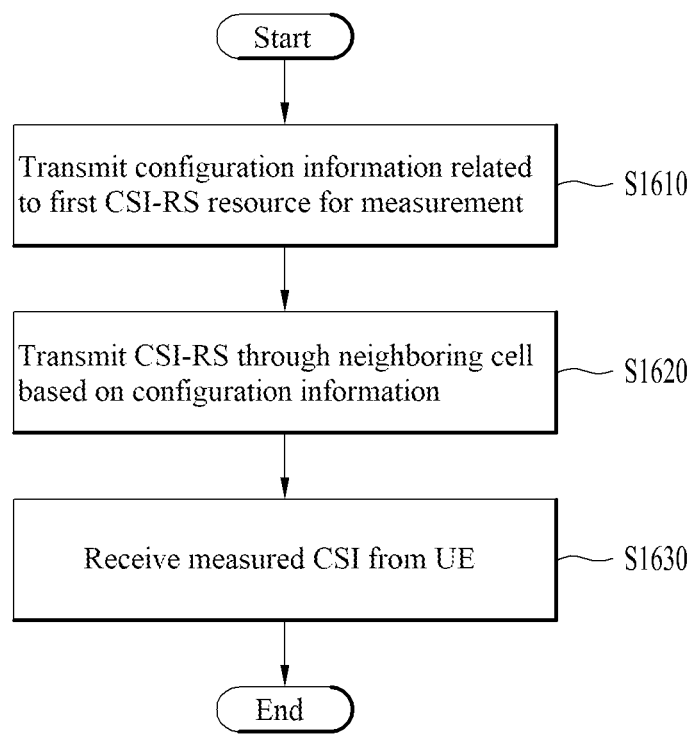
FIG. 16 is a flowchart illustrating a method for the BS to receive the CSI from the UE according to the present disclosure.

FIG. 14 is a diagram schematically illustrating a method of transmitting and receiving CSI between a UE and a BS according to the present disclosure, FIG. 15 is a flowchart illustrating a method for the UE to report the CSI according to the present disclosure, and FIG. 16 is a flowchart illustrating a method for the BS to receive the CSI from the UE according to the present disclosure.

In the following description, the BS may refer to a configuration including both the serving and neighboring cells shown in FIG. 12. That is, "BS" may be replaced with "network".

According to the present disclosure, the UE receives configuration information related to a first CSI-RS resource for measurement from the BS (S1410 and S1510). The BS transmits the configuration information related to the first CSI-RS resource for measurement to the UE (S1410 and S1610). In this case, the BS may transmit the configuration information to the UE through higher layer signaling. In addition, the BS may transmit the configuration information to the UE through a serving cell that provides services to the UE.

In the present disclosure, the configuration information may include QCL information between the first CSI-RS resource and a second CSI-RS resource related to a neighboring cell. Specifically, the QCL information may include at least one of the following information.

QCL type A information indicating that the first CSI-RS resource and the second CSI-RS resource are QCL in terms of the Doppler shift, the Doppler spread, the average delay, and the delay spread.

QCL type B information indicating that the first CSI-RS resource and the second CSI-RS resource are QCL in terms of the Doppler shift and the Doppler spread QCL type C information indicating that the first CSI-RS resource and the second CSI-RS resource are QCL in terms of the Doppler shift and the average delay QCL type D information indicating that the first CSI-RS resource and the second CSI-RS resource are QCL in terms of the spatial Rx parameter The UE receives a CSI-RS transmitted from the neighboring cell based on the configuration information (S1420 and S1520). The UE transmits the CSI-RS to the UE through the neighboring cell based on the configuration information (S1420 and S1620).

Specifically, the UE may receive the CSI-RS from the neighboring cell as follows depending on the QCL type information included in the received QCL information.

For example, when the QCL information includes the QCL type C information, the UE may receive the CSI-RS transmitted from the neighboring cell based on Doppler shift information and average delay information related to the second CSI-RS resource.

As another example, when the QCL information includes the QCL type D information, the UE may receive the CSI-RS transmitted from the neighboring cell based on Rx beam information related to the second CSI-RS resource.

As a further example, when the QCL information includes the QCL type C information and the QCL type D information, the UE may receive the CSI-RS transmitted from the neighboring cell based on the Doppler shift information, the average delay information, and the Rx beam information related to the second CSI-RS resource.

The UE measures CSI based on the received CSI-RS (S1430 and S1630). In the present disclosure, the CSI may include at least one of channel quality information (CQI), a precoding matrix indicator (PMI), a CRI, an SS/PBCH resource block indicator (SSBRI), a layer indicator (LI), and an RI.

The UE transmits the measured CSI to the BS (S1440 and S1540). Specifically, the UE transmits the measured CSI to the serving cell. The BS receives the measured CSI from the UE through the serving cell (S1440 and S1630).

Through the above processes, the UE may measure and report the CSI for the neighboring cell, and the BS may receive the CSI for the neighboring cell from the UE.

Additionally, the timing of the serving cell may not be aligned with that of the neighboring cell as described above. In other words, the serving cell and the neighboring cell may be in an asynchronous state. Here, the asynchronous state may mean that a frame boundary difference between the serving and neighboring cells is at least one (OFDM) symbol. That is, when the serving and neighboring cells are in the asynchronous state, the frame boundary difference therebetween may be at least one symbol or at least one slot.

In this case, the UE may receive the CSI-RS from the neighboring cell as follows. Specifically, the UE may receive the CSI-RS from the neighboring cell based on the timing of the CSI-RS, which is determined based on the QCL information and the configuration information.

The timing of the CSI-RS transmitted from the neighboring cell may be determined as follows.

When SSB information related to the second CSI-RS resource is configured, the timing of the CSI-RS is determined with respect to a cell configured in relation to the second CSI-RS resource When SSB information related to the second CSI-RS resource is not configured and reference serving cell information related to the second CSI-RS resource is configured, the timing of the CSI-RS is determined with respect to a cell determined based on the reference serving cell information.

When SSB information related to the second CSI-RS resource is not configured and reference serving cell information related to the second CSI-RS resource is not configured, the timing of the CSI-RS is determined with respect to the serving cell connected to the UE.

In the above-described configuration, a resource for receiving the CSI-RS from the neighboring cell may be determined in various ways.

For example, the resource for receiving the CSI-RS from the neighboring cell may be determined based on a resource configuration related to the first CSI-RS resource. Thus, the UE may receive the CSI-RS from the neighboring cell based on the resource configuration related to the first CSI-RS resource.

In particular, the location of the resource for transmitting the CSI-RS may be determined based on a higher layer parameter NZP-CSI-RS-Resource related to the first CSI-RS resource.

As another example, the resource for receiving the CSI-RS from the neighboring cell may be determined based on a resource configuration related to the second CSI-RS resource. Thus, the UE may receive the CSI-RS from the neighboring cell based on the resource configuration related to the second CSI-RS resource.

In the present disclosure, the resource configuration related to the second CSI-RS resource may include at least one of the following configurations.

A time resource configuration related to the second CSI-RS resource

A frequency resource configuration related to the second CSI-RS resource

A numerology configuration related to the second CSI-RS resource

In particular, the time/frequency resource for transmitting the CSI-RS maybe determined based on a higher layer parameter CSI-RS-Resource-Mobility related to the second CSI-RS resource.

As a further example, the resource for receiving the CSI-RS from the neighboring cell may be determined based on a resource configuration that satisfies both a first resource configuration related to the first CSI-RS resource and a second resource configuration related to the second CSI-RS resource. Thus, the UE may receive the CSI-RS from the neighboring cell based on the resource configuration satisfying both the first resource configuration related to the first CSI-RS resource and the second resource configuration related to the second CSI-RS resource.

In particular, the UE may receive the CSI-RS from the neighboring cell based on a frequency resource in which a first frequency resource related to the first CSI-RS resource included in the first resource configuration overlaps with a second frequency resource related to the second CSI-RS resource included in the second resource configuration.

In the above-described configuration, the first CSI-RS resource may be a non-zero power (NZP) CSI-RS resource or a channel state information interference measurement (CSI-IM) resource.

The second CSI-RS resource may be a CSI-RS resource configured for radio resource management (RRM).

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE through a predefined signal (e.g., a physical layer signal, a higher layer signal, etc.).

3. Device Configuration

Figure 17:
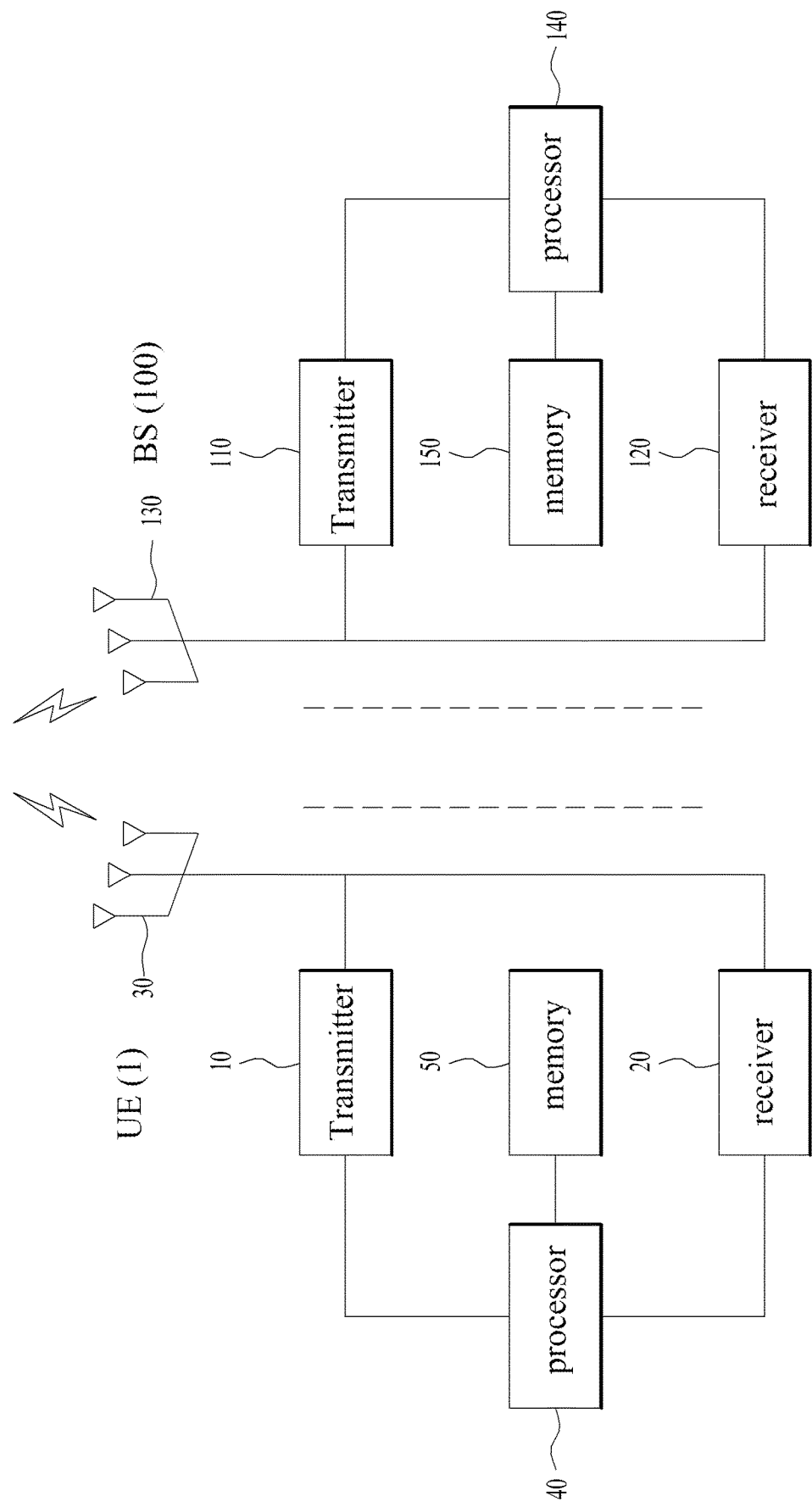
FIG. 17 is a diagram illustrating configurations of a UE and a BS by which proposed embodiments can be implemented.

FIG. 17 is a diagram illustrating configurations of a UE and a BS by which proposed embodiments can be implemented. The UE and the BS illustrated in FIG. 19 operate to implement the embodiments of the above-described DL signal transmission and reception method between the UE and the BS.

The UE 1001 may operate as a transmission end on UL and as a reception end on DL. The BS (eNB or gNB) 1100 may operate as a reception end on UL and as a transmission end on DL That is, the UE and the BS may include transmitters 1010 and 1110 and receivers 1020 and 1120, respectively, to control transmission and reception of information, data and/or messages and may include antennas 1030 and 1130, respectively, to transmit and receive information, data, and/or messages.

The UE and the BS further include processors 1040 and 1140, respectively, for performing the above-described embodiments of the present disclosure. The processors 1040 and 1140 control memories 1050 and 1150, the transmitters 1010 and 1110, and/or the receivers 1020 and 1120, respectively, to implement the above-described/proposed procedures and/or methods.

For example, the processors 1040 and 1140 include communication modems designed to implement radio communication technology (e.g., LTE or NR). The memories 1050 and 1150 are connected to the processors 1040 and 1140 and store various information related to operations of the processors 1040 and 1140. As an example, the memories 1050 and 1150 may perform a part or all of processes controlled by the processors 1040 and 1140 or store software code including the above-described/proposed procedures and/or methods. The transmitters 1010 and 1110 and/or the receivers 1020 and 1120 are connected to the processors 1040 and 1140 and transmit and/or receive radio signals. The processors 1040 and 1140 and the memories 1050 and 1150 may be a part of a processing chip (e.g., system-on-chip (SoC)).

The transmitters and receivers included in the UE and the BS may perform a packet modulation and demodulation function, a high-speed packet channel coding function, an OFDMA packet scheduling function, and/or a channelization function, for data transmission. The UE and the BS of FIG. 17 may further include low-power radio frequency (RF)/intermediate frequency (IF) units.

Figure 18:
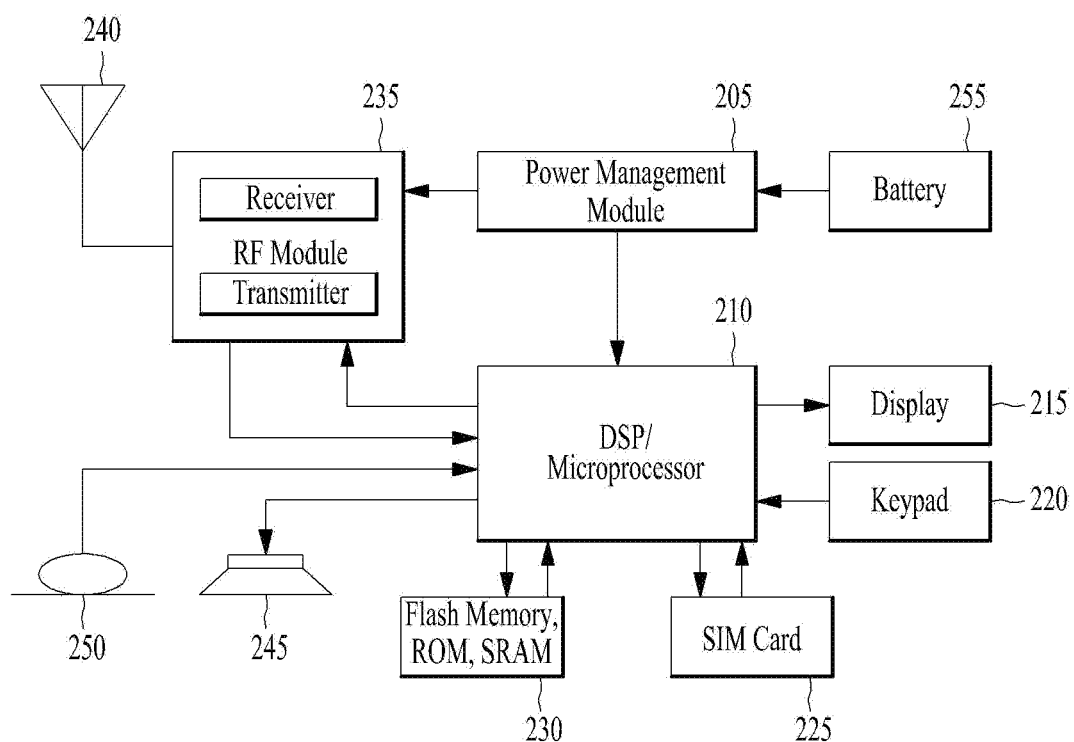
FIG. 18 is a block diagram of a communication device by which proposed embodiments can be implemented.

FIG. 18 is a block diagram of a communication device by which proposed embodiments can be implemented.

The device illustrated in FIG. 18 may be a UE and/or a BS (e.g., an eNB or a gNB) adapted to perform the above mechanism or may be any device for performing the same operation.

As illustrated in FIG. 18, the device may include a digital signal processor (DSP)/microprocessor 2210 and an RF module (transceiver) 2235. The DSP/microprocessor 2210 is electrically connected to the transceiver 2235 to control the transceiver 2235. The device may further include a power management module 2205, a battery 2255, a display 2215, a keypad 2220, a SIM card 2225, a memory device 2230, a speaker 2245, and an input device 2250, according to the selection of a designer.

Specifically, FIG. 18 illustrates a UE including the receiver 2235 configured to receive a request message from a network and the transmitter 2235 configured to transmit transmission or reception timing information to the network. The receiver and the transmitter may constitute the transceiver 2235. The UE may further include the processor 2210 connected to the transceiver 2235 (receiver and transmitter).

In addition, FIG. 18 illustrates a network device including the transmitter 2235 configured to transmit a request message to the UE and the receiver 2235 configured to receive transmission or reception timing information from the UE. These transmitter and receiver may constitute the transceiver 2235. The network further includes the processor 2210 connected to the transmitter and the receiver. This processor 2210 may be configured to calculate latency based on the transmission or reception timing information.

Thus, the processor included in the UE (or a communication device included in the UE) according to the present disclosure and the processor included in the BS (or a communication device included in the BS) according to the present disclosure may control the corresponding memories and operate as follows.

In the present disclosure, the UE may include at least one radio frequency (RF) module; at least one processor; and at least one memory operably connected to the at least one processor, for storing instructions for causing the at least one processor to perform a specific operation when the at least one processor is executed. In this case, the communication device included in the UE may be configured to include the at least one processor and the at least one memory. The communication device may be configured to include that at least one RF module or may be configured to be connected to at least one RF module without including the at least one RF module.

The at least one processor included in the UE (or the at least one processor of the communication device included in the UE) may be configured to receive configuration information related to a first CSI-RS resource for measurement by controlling the at least one RF module. In this case, the configuration information may include QCL information between the first CSI-RS resource and a second CSI-RS resource related to a neighboring cell. The at least one processor may be configured to receive a CSI-RS transmitted from the neighboring cell based on the configuration information by controlling the at least one RF module. The at least one processor may be configured to report CSI measured based on the received CSI-RS to a serving cell by controlling the at least one RF module.

The UE (or the communication device included in the UE) may be configured to communicate with at least one of a mobile terminal, a network, or a self-driving vehicle other than a vehicle in which the UE is included.

In the present disclosure, the BS may include at least one radio frequency (RF) module; at least one processor; and at least one memory operably connected to the at least one processor, for storing instructions for causing the at least one processor to perform a specific operation when the at least one processor is executed. In this case, the communication device included in the BS may be configured to include the at least one processor and the at least one memory. The communication device may be configured to include that at least one RF module or may be configured to be connected to at least one RF module without including the at least one RF module.

The at least one processor included in the BS (or the at least one processor of the communication device included in the BS) may be configured to transmit the configuration information related to the first CSI-RS resource for measurement to the UE by controlling the at least one RF module. In this case, the configuration information may include the QCL information between the first CSI-RS resource and the second CSI-RS resource related to the neighboring cell. The at least one processor may be configured to receive the CSI measured by the UE by controlling the at least one RF module. In this case, the CSI may include measurement information for the CSI-RS transmitted from the neighboring cell to the UE based on the configuration information.

The UE in the present disclosure may use a personal digital assistant (PDA), a cellular phone, a personal communication service (PCS) phone, a global system for mobile (GSM) phone, a wideband code division multiple access (WCDMA) phone, a mobile broadband system (MBS) phone, a hand-held PC, a laptop PC, a smartphone, or a multi-mode multi-band (MM-MB) terminal.

In this case, the smartphone refers to a terminal taking the advantages of both a mobile communication terminal and a PDA and may be a terminal which incorporates functions of the PDA, i.e., a scheduling function and a data communication function such as fax transmission and reception and Internet connection, into the mobile communication terminal. The MM-MB terminal refers to a terminal which has a multi-modem chip therein and which can operate in any of a mobile Internet system and other mobile communication systems (e.g. a code division multiple access (CDMA) 2000 system, a WCDMA system, etc.).

Embodiments of the present disclosure may be implemented by various means, for example, hardware, firmware, software, or a combination thereof.

In a hardware implementation, methods according to the embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software implementation, the methods according to the embodiments of the present disclosure may be implemented in the form of a module, a procedure, a function, etc. for performing the above-described functions or operations. For example, software code may be stored in the memory 11050 or 1150 and executed by the processor 1040 or 1140. The memory is located at the interior or exterior of the processor and may transmit and receive data to and from the processor via various known means.

The above-described communication device may be a BS, a network node, a transmission terminal, a wireless device, a wireless communication device, a vehicle, a vehicle having a self-driving function, an unmanned aerial vehicle (UAV), an artificial intelligence (AI) module, a robot, an augmented reality (AR) device, a virtual reality (VR) device, or the like.

For example, the UE may include a cellular phone, a smartphone, a laptop computer, a digital broadcast terminal, a PDA, a portable multimedia player (PMP), a navigation device, a slate PC, a tablet PC, an ultrabook, or a wearable device (e.g., a smartwatch, smartglasses, or a head mounted display (HMD)). For example, the UAV may be an unmanned aircraft flying according to a wireless control signal. For example, the HMD is a display device wearable on the head, which may be used to implement VR or AR.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

Additionally, the embodiments of the present disclosure are applicable to various applications such as a self-driving vehicle, a UAV, etc.

The invention claimed is:

1. A method of reporting channel state information (CSI) by a user equipment (UE) in a wireless communication system, the method comprising:
receiving configuration information related to a first channel state information reference signal (CSI-RS) resource for measurement, wherein the configuration information includes quasi co-location (QCL) information between the first CSI-RS resource and a second CSI-RS resource related to a neighboring cell;
receiving a CSI-RS from the neighboring cell based on a timing of the CSI-RS determined based on the QCL information and the configuration information; and
reporting the CSI measured based on the received CSI-RS to a serving cell,
wherein, based on synchronization signal block (SSB) information related to the second CSI-RS resource being configured, the timing of the CSI-RS is determined with respect to a cell configured in relation to the second CSI-RS resource.

2. The method of claim 1, wherein based on the SSB information related to the second CSI-RS resource being not configured and reference serving cell information related to the second CSI-RS resource being configured, the timing of the CSI-RS is determined with respect to a cell determined based on the reference serving cell information.

3. The method of claim 1, wherein based on the SSB information related to the second CSI-RS resource is not configured and reference serving cell information related to the second CSI-RS resource is not configured, a timing of the neighboring cell is determined with respect to the serving cell connected to the UE.

4. The method of claim 1, wherein the QCL information includes at least one of:
QCL type A information notifying that the first CSI-RS resource and the second CSI-RS resource are quasi co-located (QCL) in terms of a Doppler shift, a Doppler spread, an average delay and a delay spread,
QCL type B information notifying that the first CSI-RS resource and the second CSI-RS resource are QCL in terms of the Doppler shift and the Doppler spread,
QCL type C information notifying that the first CSI-RS resource and the second CSI-RS resource are QCL in terms of the Doppler shift and the average delay, or
QCL type D information notifying that the first CSI-RS resource and the second CSI-RS resource are QCL in terms of a spatial reception (Rx) parameter.

5. The method of claim 4, wherein based on that the QCL information includes the QCL type C information, receiving the CSI-RS transmitted from the neighboring cell based on the QCL information comprises receiving the CSI-RS transmitted from the neighboring cell based on Doppler shift information and average delay information related to the second CSI-RS resource.

6. The method of claim 4, wherein based on that the QCL information includes the QCL type D information, receiving the CSI-RS transmitted from the neighboring cell based on the QCL information comprises receiving the CSI-RS transmitted from the neighboring cell based on Rx beam information related to the second CSI-RS resource.

7. The method of claim 4, wherein based on that the QCL information includes the QCL type C information and the QCL type D information, receiving the CSI-RS transmitted from the neighboring cell based on the QCL information comprises receiving the CSI-RS transmitted from the neighboring cell based on Doppler shift information, average delay information, and Rx beam information related to the second CSI-RS resource.

8. The method of claim 1, wherein the CSI-RS is received from the neighboring cell based on a resource configuration related to the first CSI-RS resource.

9. The method of claim 1, wherein the CSI-RS is received from the neighboring cell based on a resource configuration related to the second CSI-RS resource.

10. The method of claim 9, wherein the resource configuration related to the second CSI-RS resource includes at least one of a time resource configuration related to the second CSI-RS resource, a frequency resource configuration related to the second CSI-RS resource, or a numerology configuration related to the second CSI-RS resource.

11. The method of claim 1, wherein the CSI-RS is received from the neighboring cell based on a resource configuration satisfying both a first resource configuration related to the first CSI-RS resource and a second resource configuration related to the second CSI-RS resource.

12. The method of claim 11, wherein the CSI-RS is received from the neighboring cell based on a frequency resource in which a first frequency resource related to the first CSI-RS resource included in the first resource configuration overlaps with a second frequency resource related to the second CSI-RS resource included in the second resource configuration.

13. The method of claim 1, wherein the configuration information is received through higher layer signaling.

14. The method of claim 1, wherein the first CSI-RS resource is a non-zero power (NZP) CSI-RS resource or a channel state information interference measurement (CSI-IM) resource.

15. The method of claim 1, wherein the second CSI-RS resource is a CSI-RS resource for radio resource management (RRM).

16. A user equipment (UE) for reporting channel state information (CSI) in a wireless communication system, the UE comprising:
  at least one radio frequency (RF) module;
  at least one processor; and
  at least one memory operably connected to the at least one processor and storing instructions that, when executed, cause the at least one processor to perform operations comprising:
  receiving configuration information related to a first channel state information reference signal (CSI-RS) resource for measurement by controlling the at least one RF module, wherein the configuration information includes quasi co-location (QCL) information between the first CSI-RS resource and a second CSI-RS resource related to a neighboring cell;
  receiving a CSI-RS from the neighboring cell based on a timing of the CSI-RS determined based on the QCL information and the configuration information by controlling the at least one RF module; and
  reporting the CSI measured based on the received CSI-RS to a serving cell by controlling the at least one RF module, wherein, based on synchronization signal block (SSB) information related to the second CSI-RS resource being configured, the timing of the CSI-RS is determined with respect to a cell configured in relation to the second CSI-RS resource.

17. The UE of claim 16, wherein the UE communicates with at least one of a mobile terminal, a network, or an autonomous driving vehicle except a vehicle including the UE.

18. A base station for receiving channel state information (CSI) in a wireless communication system, the base station comprising:
  at least one radio frequency (RF) module;
  at least one processor; and
  at least one memory operably connected to the at least one processor and storing instructions that, when executed, cause the at least one processor to perform operations comprising:
  transmitting configuration information related to a first channel state information reference signal (CSI-RS) resource for measurement to a user equipment (UE) by controlling the at least one RF module, wherein the configuration information includes quasi co-location (QCL) information between the first CSI-RS resource and a second CSI-RS resource related to a neighboring cell; and
  receiving the CSI measured by the UE by controlling the at least one RF module, wherein the CSI includes measurement information for a CSI-RS transmitted from the neighboring cell based on a timing of the CSI-RS determined based on the QCL information and the configuration information, and wherein, based on synchronization signal block (SSB) information related to the second CSI-RS resource being configured to the UE, the timing of the CSI-RS is determined with respect to a cell configured in relation to the second CSI-RS resource.

* * * * *